(12) United States Patent
Harve

(10) Patent No.: US 11,882,936 B2
(45) Date of Patent: Jan. 30, 2024

(54) MAGNET, PIN, AND SPRING ASSISTED LOCKABLE HORIZONTALLY AND VERTICALLY ALIGNING ERGONOMIC NOVEL LATCH MECHANISMS

(71) Applicant: Shweta Harve, Parker, TX (US)

(72) Inventor: Shweta Harve, Parker, TX (US)

( * ) Notice: Subject to any disclaimer, the term of this patent is extended or adjusted under 35 U.S.C. 154(b) by 0 days.

(21) Appl. No.: 17/344,441

(22) Filed: Jun. 10, 2021

(65) Prior Publication Data

US 2022/0395096 A1    Dec. 15, 2022

(51) Int. Cl.
   *A47B 95/00*    (2006.01)

(52) U.S. Cl.
   CPC .......... *A47B 95/00* (2013.01); *A47B 2230/02* (2013.01); *A47B 2230/07* (2013.01)

(58) Field of Classification Search
   CPC .. A47B 95/00; A47B 2230/02; A47B 2230/07
   USPC ............................................ 312/111; 108/90
   See application file for complete search history.

(56) References Cited

U.S. PATENT DOCUMENTS

| | | | |
|---|---|---|---|
| 314,641 A * | 3/1885 | Andrews | |
| 3,342,147 A * | 9/1967 | Shettles | A47B 87/002 108/186 |
| 3,490,797 A * | 1/1970 | Platte | F16B 5/07 403/231 |
| 3,675,955 A * | 7/1972 | Hajduk | F16B 12/26 217/65 |
| 3,862,809 A * | 1/1975 | Bodner | F16B 12/20 403/231 |
| 3,999,878 A * | 12/1976 | Robinson | F16B 12/46 403/231 |
| 4,099,293 A * | 7/1978 | Pittasch | E05D 7/12 403/231 |
| 4,148,454 A * | 4/1979 | Carlson | F16B 12/38 312/263 |
| 4,325,649 A * | 4/1982 | Rock | F16B 12/2036 403/231 |
| 4,752,150 A * | 6/1988 | Salice | F16B 12/26 403/231 |
| 4,826,345 A * | 5/1989 | Salice | F16B 12/2063 403/231 |
| 5,419,628 A * | 5/1995 | Myslinski, Jr. | A47B 47/0075 312/109 |
| 5,678,948 A * | 10/1997 | White | A47B 95/00 403/321 |

(Continued)

*Primary Examiner* — Daniel J Troy
*Assistant Examiner* — Timothy M Ayres

(57) ABSTRACT

A system for fastening panels at 90-degree angles and at 180-degree angles is provided comprising a frame hammer assembly attached proximate a first edge of a first panel and a frame dowel pin assembly attached proximate a second edge of a second panel. At least one dowel pin protrudes from the dowel pin assembly, the at least one pin inserted into an alignment hole in the frame hammer assembly upon placement of the first edge against the second edge and alignment of the assemblies. A rotatable hammer attached to the hammer assembly, the hammer attached, after rotation, to the dowel pin assembly. A hammer magnet is attached to the hammer and one of a frame magnet and a frame steel plate attached to the dowel pin assembly, the hammer magnet and the one of the frame magnet and frame steel plate attracting and contacting after rotation.

25 Claims, 36 Drawing Sheets

(56) References Cited

U.S. PATENT DOCUMENTS

| | | | | |
|---|---|---|---|---|
| 5,921,095 | A * | 7/1999 | Lee | F25D 29/005 |
| | | | | 62/DIG. 13 |
| 6,464,423 | B1 * | 10/2002 | Klein | A47B 87/002 |
| | | | | 292/202 |
| 7,234,739 | B2 * | 6/2007 | Saitoh | E05C 19/163 |
| | | | | 292/251.5 |
| 7,520,228 | B2 * | 4/2009 | Mangano | A47B 87/002 |
| | | | | 108/115 |
| 8,579,389 | B1 * | 11/2013 | Kuo | A47B 87/008 |
| | | | | 312/111 |
| 10,076,185 | B1 * | 9/2018 | Bennett | A47B 67/04 |
| 11,497,313 | B2 * | 11/2022 | Harve | F16B 1/00 |
| 2003/0222544 | A1 * | 12/2003 | Kelley | F16B 12/18 |
| | | | | 312/111 |

* cited by examiner

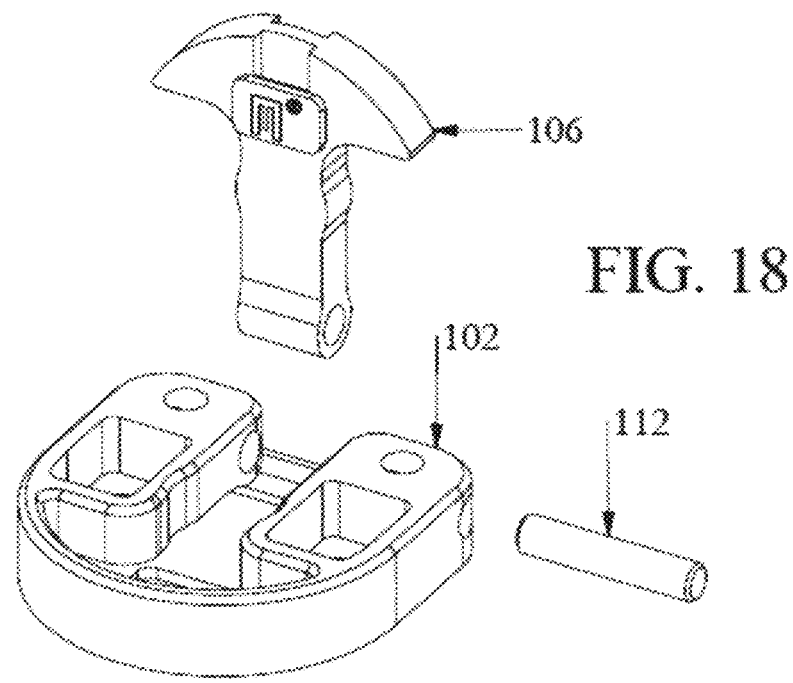
FIG. 18
FIG. 19
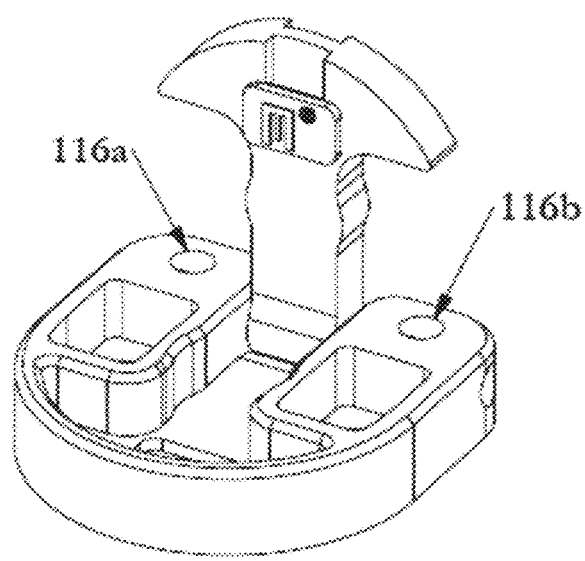

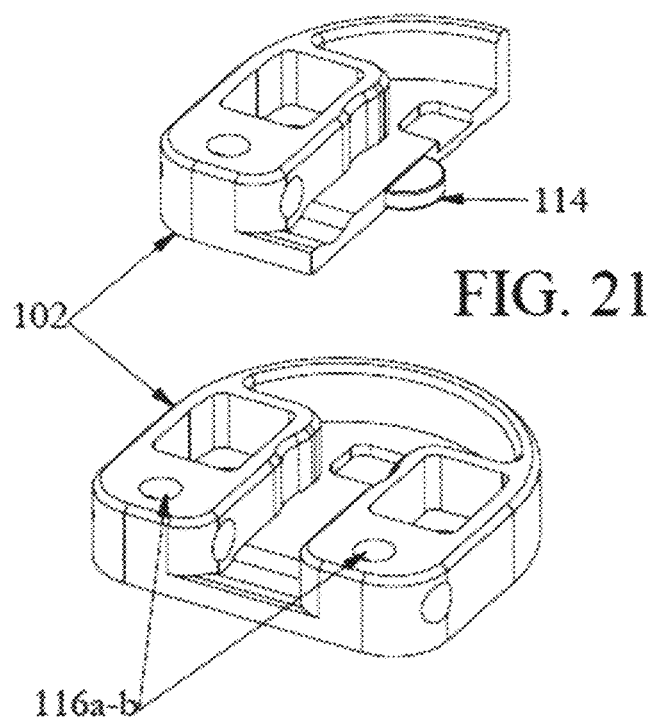
FIG. 21
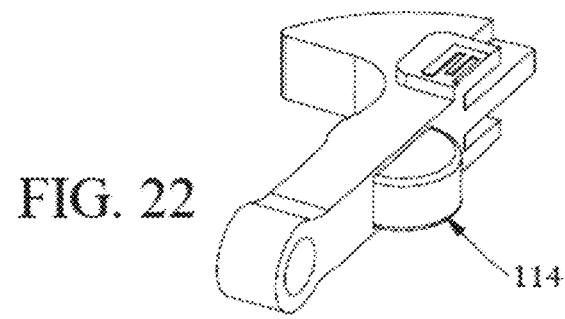
FIG. 22
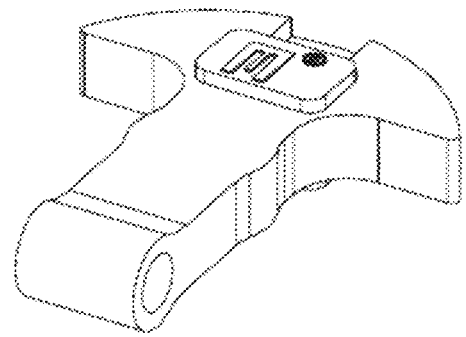

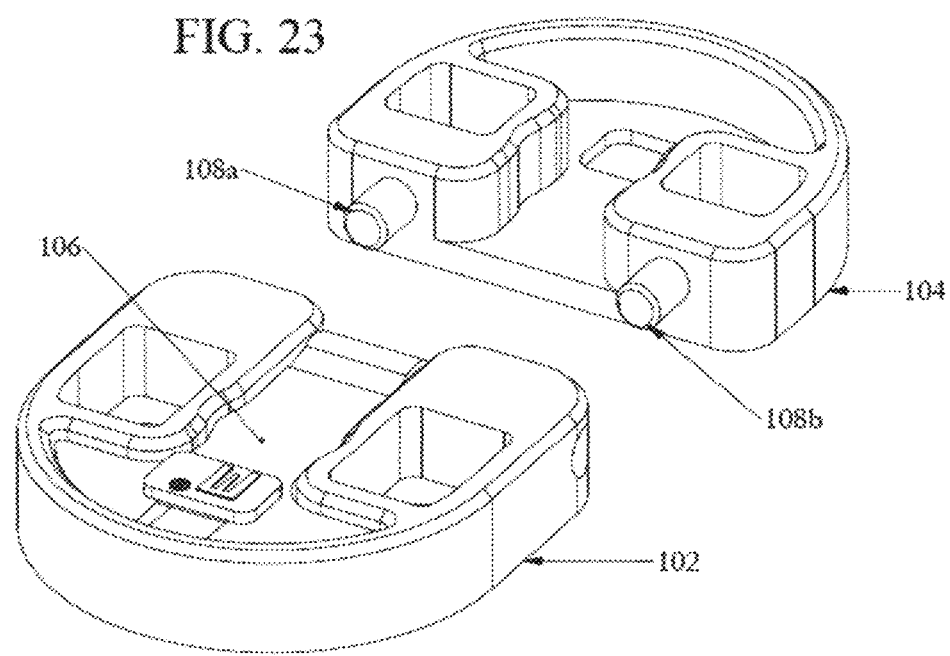

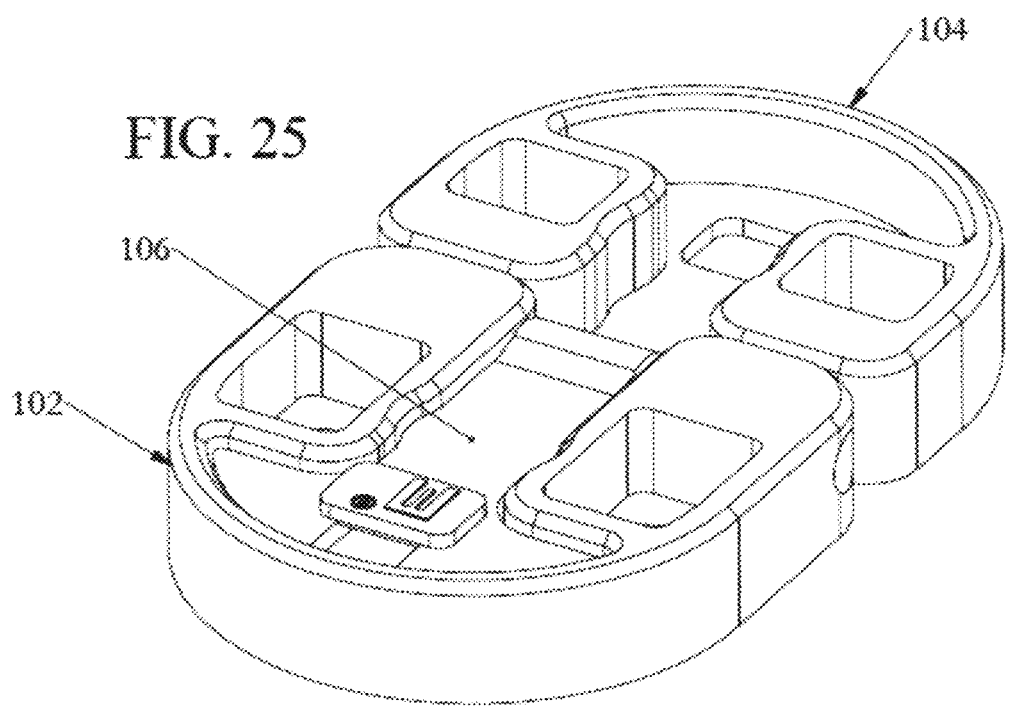

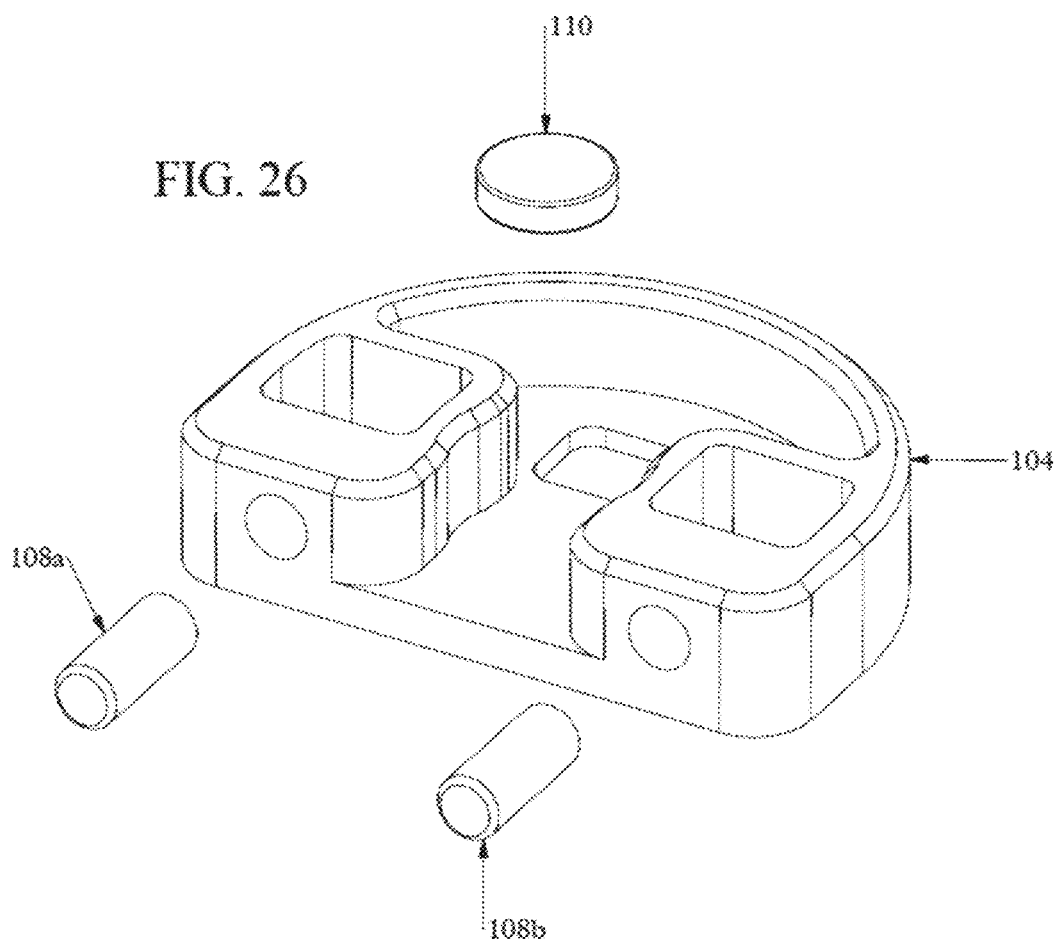

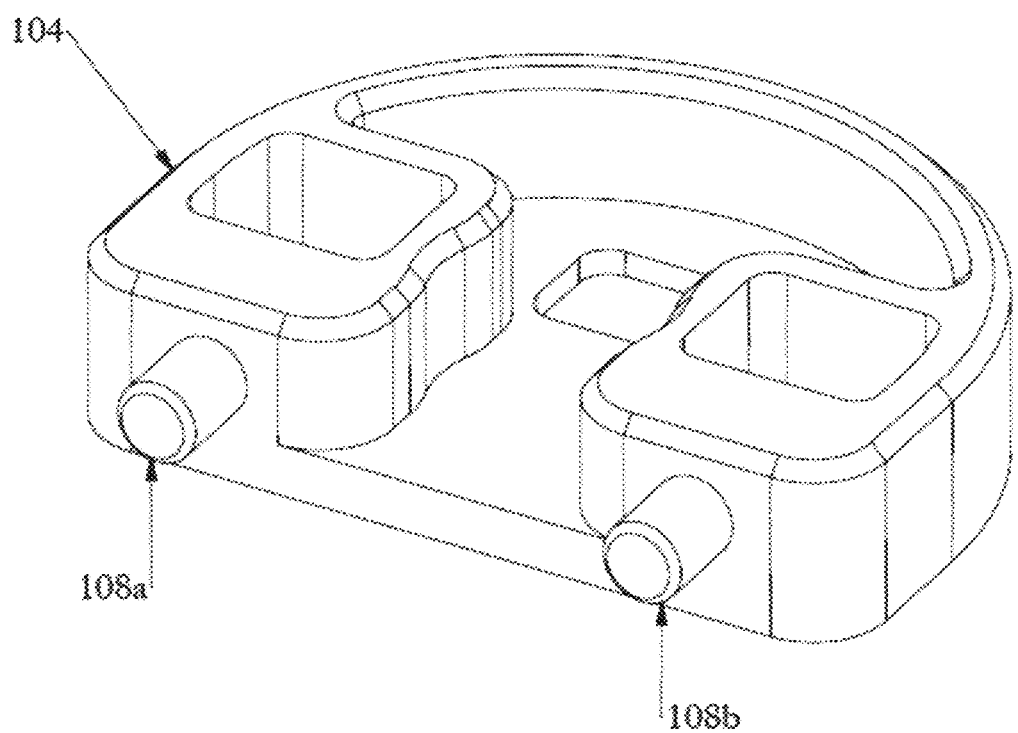
FIG. 28
FIG. 29
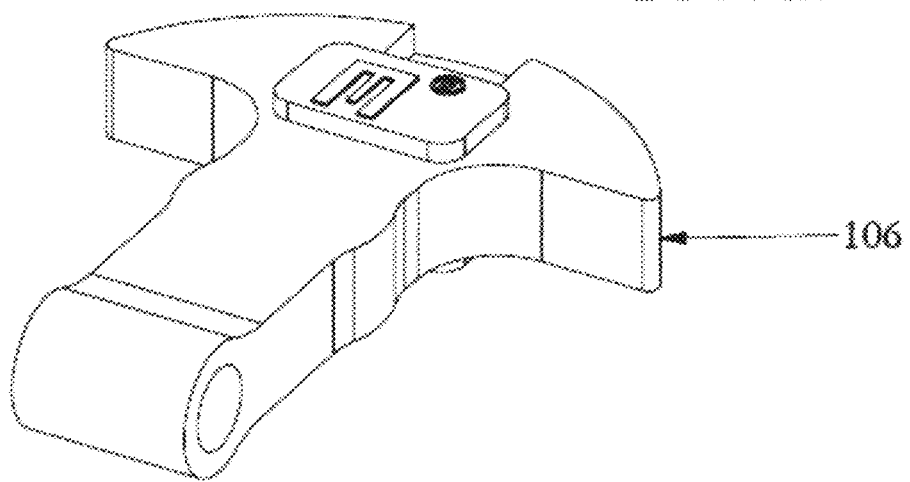

90°L™ TECHNICAL SPECIFICATIONS:

| Loading capacity | 132lbs or 60kgs | Appearance | Invisible, smooth finish |
|---|---|---|---|
| Panel thickness | Min. 1/2 in and up | Material | High performance engineering plastic |
| Dimensions | L 1.24in x W 1.25in x D 0.27in OR L 1.24in x W 1.25in x D 0.36in | Colors | Customizable covers to suit application |

90°L™ APPLICATIONS:

| Shelves | Signage Exhibitions & Displays | Structures and L Supports |
|---|---|---|
| Corner construction | Commercial Office Space | Knockdown worktables |
| Cabinetry | Partitions | Floating shelves on wall |
| Office Desks | Interior Design Projects | Acoustic paneling |
| Retail Displays and Fixtures | Furniture Manufacture | Temporary Shelters/Structures |
| RV & Marine | Wood Joints in Knock Down Furniture or Ready-To-Assemble Furniture (RTA) | Tradeshow Partitions |
| Wardrobes/Closets | Wall anchors | Table Corners |
| Modular Furniture | Building Frame | DIY garden shed |
| Chests | Bookcase | Nightstand |
| Wardrobe | Dresser | Windows |

90°L™ CAN REPLACE:

| L Bracket/Support | Striplox 90D Right Angle Connectors | Striplox 90D-98 Right Angle Joiner |
|---|---|---|
| Corner Brace | Angle Bracket | 90° connecting plate |
| Striplox Mini 60 Invisible Joiner | Door and Window Bolt 90D Right Angle Latch | Buckle Bending Sliding Lock |
| 90° Hold Down Clamp-Locking CamLatch Boat Caravan Campers | 90° Clamps | Carriage Bolts |
| Elevator Bolts | Hanger Bolts | Hanger Screws |
| Tee Nuts | Locking Latch Hasps | Lock Dowel System |
| Bar Gate Latches Safety Door Lock | Plastic chair Brace | Non-locking spring steel clip |
| Square corner brace | Suspension fittings set for wooden screw (M/F) | Panel mounting system Push Fit Fastener |

FIG. 39

180°D™ TECHNICAL SPECIFICATIONS:

| Loading capacity | 132lbs or 60kgs | Appearance | Invisible, smooth finish |
|---|---|---|---|
| Panel thickness | Min. 1/2 in and up | Material | High performance engineering plastic |
| Dimensions | L 1.24in x W 1.25in x D 0.27in OR L 1.24in x W 1.25in x D 0.36in | Colors | Customizable covers to suit application |

180°D™ APPLICATIONS:

| Tables | Architectural Panels | Workstations |
|---|---|---|
| Countertops | Display Boards | Large Exhibition Displays |
| Walls and Partitions | Retail Displays and Fixtures | Wood Joints in Knock Down Furniture or Ready-To-Assemble Furniture (RTA) |
| Paneling | Tradeshow Partitions | Modular Furniture |
| Signage | Temporary Shelters/Structures | RV & Marine |
| Acoustic Paneling | Workbenches | |

180°D™ CAN REPLACE:

| Striplox 180 D Panel Connector | Striplox Megalox Connector | Italiana Ferramenta Quick Ø 35 |
|---|---|---|
| Striplox Pro-concealed/ Surface Mount Connectors | Striplox Pro 55 Concealed Connector | Sugatsune spring-loaded bar latch |
| Sugatsune contemporary stainless-steel latch | Sugatsune Hasp | Sugatsune spring loaded barrel slide bolt |
| Duo 30 Wall Connector | Chest Latch | Draw Latch |
| 100/15 Duo fastener | Elbow Latch | Solid male/female fitting |
| 62/15 Duo connector | Conventional Rotating Eye Hasp | Lock Dowel System |
| Heavy Duty Bar Gate Latches Safety Door Lock | Double action joint fastener | Door and Window Bolt Latch |
| Buckle Bending Sliding Lock | Door Hasp Latch | Toggle Clamp |
| Hold Down Clamp Locking Cam Latch Boat Caravan Campers | Carriage Bolts | Elevator Bolts |
| Mating Bolts | | |

FIG. 42

MAGNET, PIN, AND SPRING ASSISTED LOCKABLE HORIZONTALLY AND VERTICALLY ALIGNING ERGONOMIC NOVEL LATCH MECHANISMS

CROSS REFERENCE TO PREVIOUS APPLICATIONS

The present non-provisional patent application is a continuation-in-part of U.S. patent application Ser. No. 16/594,048 filed Oct. 6, 2019.

FIELD OF THE APPLICATION

The present disclosure is in the field of devices for attaching panels. More particularly, the present disclosure provides systems and methods of latching mechanisms with the assistance of magnets and pins for assembling structures such as furniture and/or other flat panels and components.

BACKGROUND OF THE INVENTION

Previous implementations of latching mechanisms may be bulky, expensive, or require significant effort to engage and disengage, and do not always provide secure engagement. For example, one of the most compact devices in prior art is described by White (U.S. Pat. No. 5,678,948). While the device is small, the lever shown may require significant finger force on the part of the user. Alternatively, if a loose fit is provided in the latch described by White, accidental disengagement may occur. Other devices may offer different levels of user force and/or security, but they tend to be bulky and expensive.

SUMMARY OF THE INVENTION

The latch described in this application is used to secure flat panels quickly and with very minimum effort. The latching effectiveness is secure, and accidental disengagement is unlikely. Alignment of the panels is facilitated via the assistance of alignment pins and magnetic guides. When disassembly is desirable, the latch is quickly unlatched with minimum effort from the user. The latch is composed of three main parts, two frames and a rotatable hammer. The frames are sturdy generally rectangular components that are bolted on the edges of the panels that need to be secured. One of the frames has protruding pins that are inserted in cavities on the mating frame. Magnets in the hole help the user aligning the pins and holes. The engaged pins and holes define the relative location in two dimensions, while the location on the third dimension is defined by bottoming the pins. Then, the rotatable part called the hammer is rotated either 90 or 180 degrees by the users (or is rotated automatically in some embodiments) and locks the two frames (and therefore the panels) together. The hammer itself has locking mechanisms that prevent its accidental movement out of a latched position. The separation loads do not affect the locking mechanism that secures the hammer, which allows substantial resistance against unwanted separation, while unlocking and unlatching can be done with reduced effort.

DESCRIPTION OF THE DRAWINGS

FIG. 18 is a diagram of a frame hammer assembly according to an embodiment of the present disclosure.

FIG. 19 is a diagram of a frame hammer assembly according to an embodiment of the present disclosure.

FIG. 21 is a diagram of a frame hammer assembly according to an embodiment of the present disclosure.

FIG. 22 is a diagram of a hammer according to an embodiment of the present disclosure.

FIG. 23 is a diagram of a frame dowel pin assembly according to an embodiment of the present disclosure.

FIG. 24 is a diagram of a frame hammer assembly according to an embodiment of the present disclosure.

FIG. 25 is a diagram of a frame dowel pin assembly and a frame hammer assembly according to an embodiment of the present disclosure.

FIG. 26 is a diagram of a frame dowel pin assembly according to an embodiment of the present disclosure.

FIG. 28 is a diagram of a frame dowel pin assembly according to an embodiment of the present disclosure.

FIG. 29 is a diagram of a hammer according to an embodiment of the present disclosure.

FIG. 39 is charts listing technical specifications, applications, and candidates for replacement by the model 90L mechanism.

FIG. 42 is charts listing technical specifications, applications, and candidates for replacement by the model 90L mechanism.

LIST OF MAJOR COMPONENTS OR FEATURES

Figure 1:
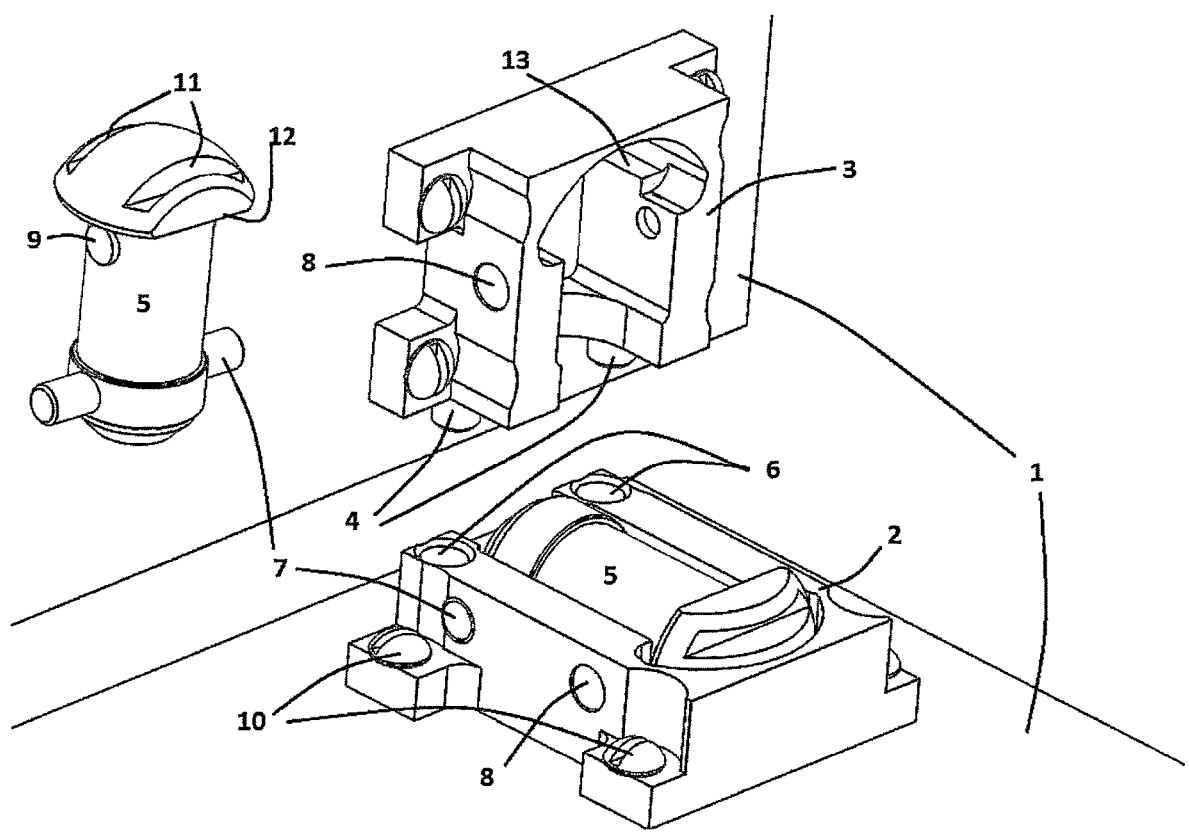
FIG. 1 shows the 90 degree manually operated latch in its unlatched position.

1. Panels that are secured
2. Primary Frame, the frame that encloses the hammer pivot
3. Secondary Frame, the frame that is engaged by the hammer to engage the latch
4. Alignment Pin on Secondary Frame
5. Hammer
6. Alignment Holes on Primary Frame
7. Main hammer pivot (shaft)
8. Stationary magnets
9. Magnets installed on Hammer
10. Mounting screws
11. Hammer Groove
12. Hammer Head
13. Magnetic Bolts
14. Torsion Spring for Hammer 5
15. Bracket for Torsion Spring 14 on Primary Frame 2
16. Cavity for Torsion Spring 14 on Hammer 5
17. Sheet Metal Hammer lock
18. Separation Springs
19. Locking Bolt Pin.
20. Locking Nut
21. Locking Spring
22. Hammer Ramp
23. Hammer Locking Hole
24. Locking Spring
25. Release Button
26. Release Pin

DETAILED DESCRIPTION

Figure 2:
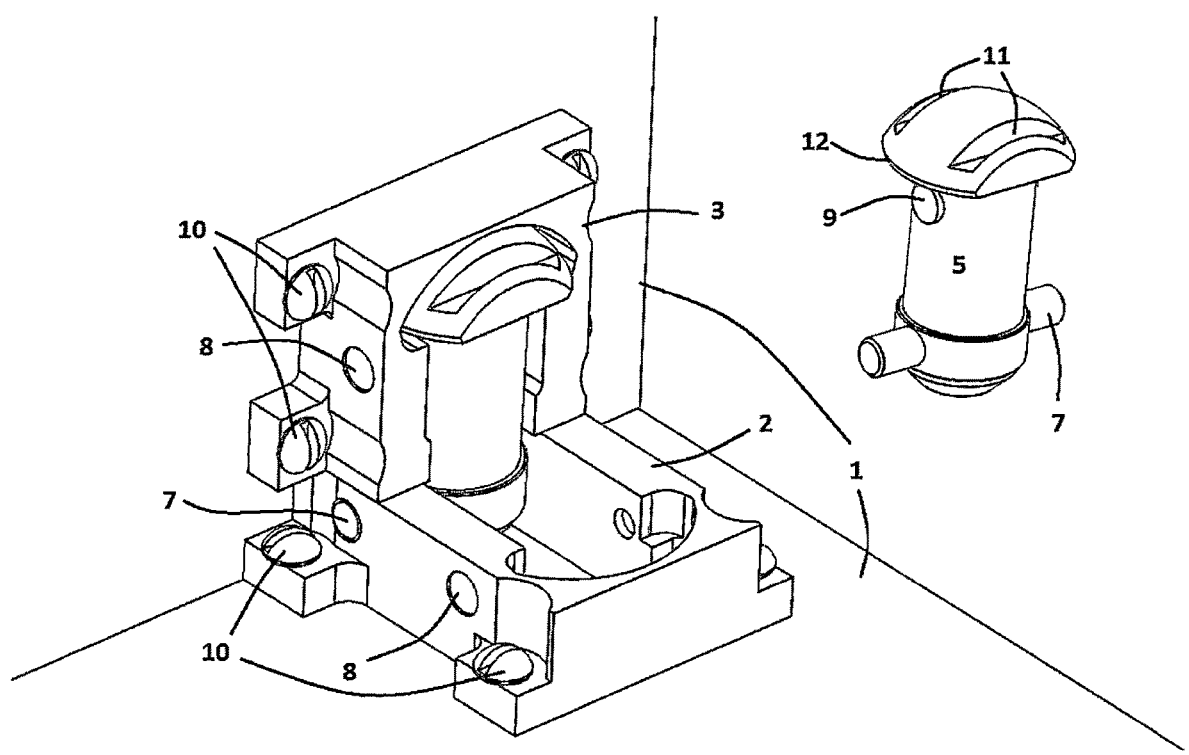
FIG. 2 shows the 90 degree manually operated latch in its latched position.

The first embodiment is a manually operated 90 degree latch (the panels engaged meet at right angles), where the movement of the hammer is done entirely by the user. This may be the lowest cost latch. FIG. 1 shows the latch and the two panels that will secure in the unlatched position. FIG. 2 shows the same latch and panels in the latched position. In both FIGS. 1 and 2, an additional hammer is shown so as the magnet installation on the hammer can be shown. In this embodiment, when the latch is unlatched, the hammer (a non-magnetic material, preferably metallic so that it is reasonably strong, and preferably light alloy such as aluminum) is mostly parallel to the Primary Frame 2 as shown in FIG. 1. The magnets installed on the hammer 9 are in proximity to the magnets 8 on the Frame 2 and therefore keep the hammer immobilized in that location. When the time comes to connect the two panels (1), the panels are brought together so that the alignment pins 4 get aligned with the holes 6 and the Primary Frame 2 and Secondary Frame 3 are brought in together as shown in FIG. 2. At that time, the user rotates the hammer by engaging the special grooves 11 and rotates the hammer 90 degrees against the magnetic force from the Primary Frame 2. But as the hammer approaches the position shown in FIG. 2, the magnetic force with the stationary magnet 8 on the secondary frame dominates and effectively secures the latch in the latched position. Specifically, the head of the hammer 12 engages two flat faces 13 on secondary frame 3 and prevents separation of the two frames. Now, the two panels 1 cannot be separated. If a disturbance tries to move the hammer out of position momentarily, the magnetic force will quickly return it back into the latched position. It needs to be noted that when the cylindrical magnets 8 and 9 are installed, special care is taken to ensure that the magnet poles (normally aligned in the direction of the axis of the magnet) have proper polarity so as to have attractive forces rather than repulsive forces.

Figure 3:
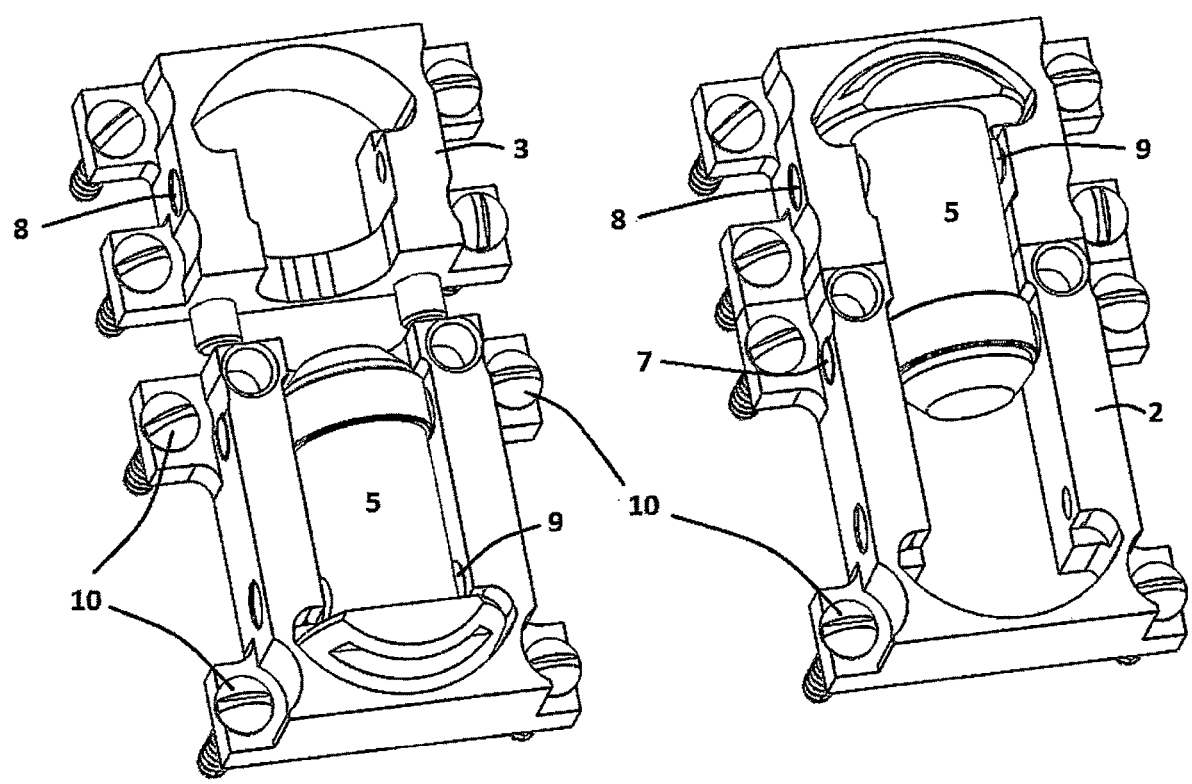
FIG. 3 shows the 180 degree manually operated latch in both unlatched and latched position.

The second embodiment is a variation of the above: the manually operated 180 degree latch. FIG. 3 shows the 180 degree manually operated latch in its unlatched position (left) and the latched position (right). The functions are identical, but the position is different. It needs to be pointed out that in the embodiment shown, the Primary Frame 2 has alignment holes 6 in two locations for accepting a secondary frame at right angles or at 180 degrees. Therefore, in FIG. 3, the active alignment holes 6 on the Primary Frame 2 are not visible in the angle shown, but are there nevertheless. This embodiment allows for the same primary frame to be used for both 90 and 180 degree latches. But this limitation is not necessary for the design to work.

Figure 4:
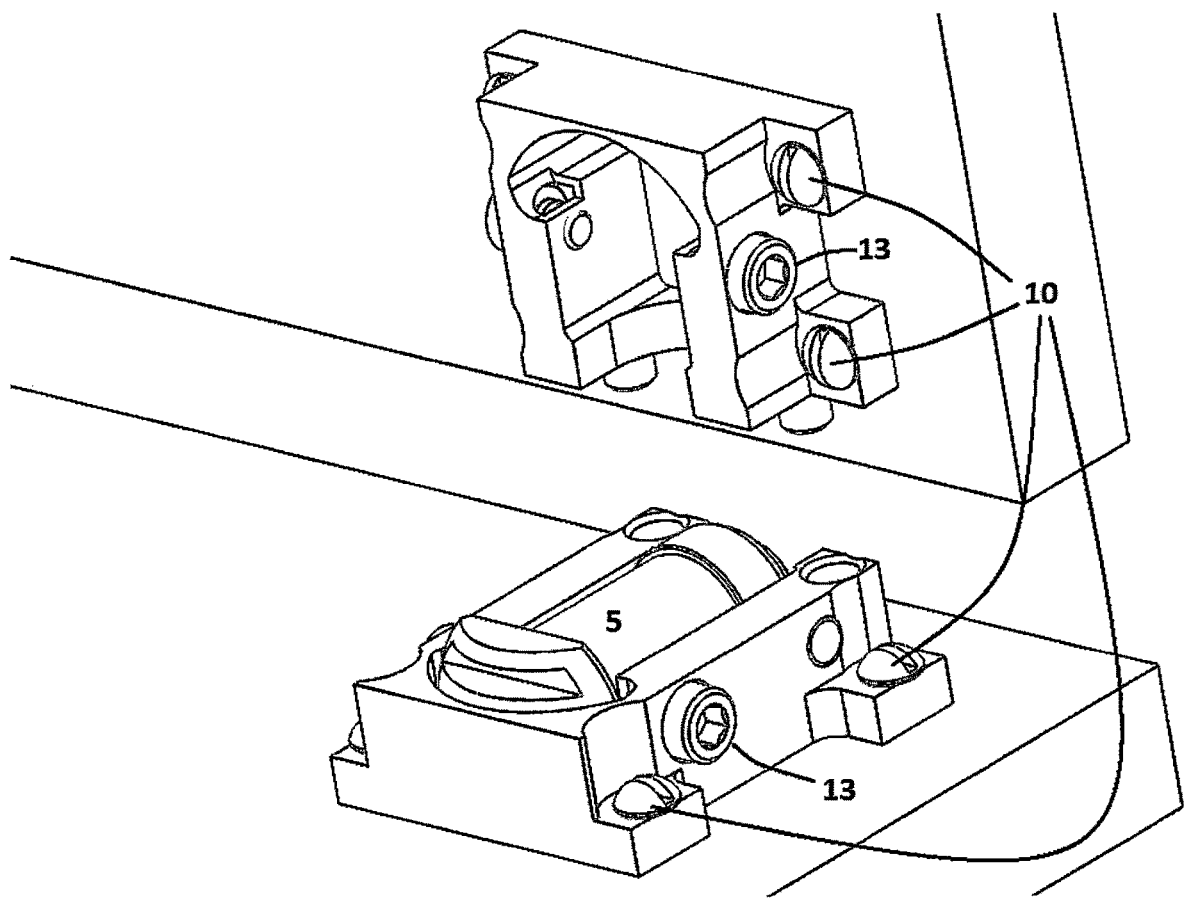
FIG. 4 shows the 90 degree latch where the stationary magnets are replaced by magnetic bolts.

Two more embodiments are as follows. The Stationary Magnets 8 are replaced with magnetic bolts 13, for both 90 and 180 degree latch. This is shown in FIG. 4. Note that FIG. 4 shows only the 90 degree latch (in its unlatched position), but the 180 degree version is obvious. The magnetic bolt 13 is simply a bolt made out of steel or other magnetic materials. The usefulness of this is that the cost may be lower as two magnets are replaced by bolts, and the assembly maybe easier as it is easier to tighten a bolt than secure a magnet. Obviously, there can be a reversal, and the magnets can be moved in the stationary position on the frame, while the magnetic bolts can be moved on the hammer.

Figure 5:
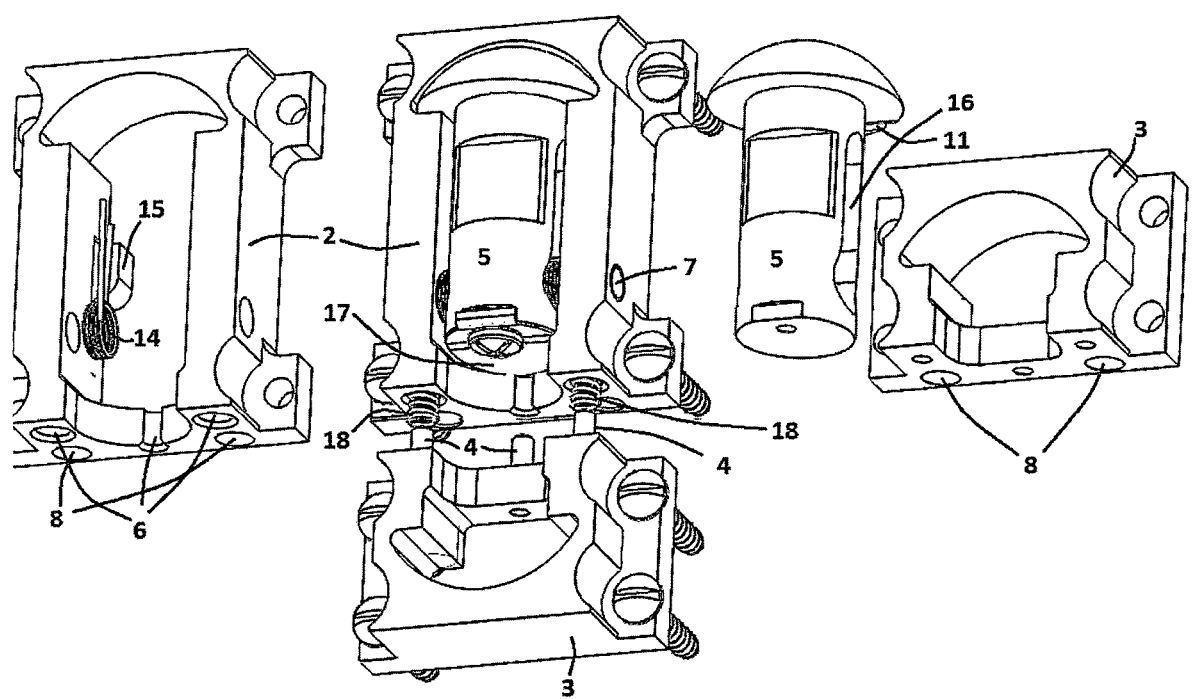
FIG. 5 shows the 180 degree automated latch with spring sheet metal lock and torsion springs.

The next embodiment is a more automated variation of the above latch, shown in FIG. 5. The latch shown in a 180 degree version in its unlatched position. An additional Primary Frame 2, Secondary Frame 3, and Hammer 5 have been inserted in the drawing in order to point out features that are not readily visible in the assembled latch. The main added feature in this latch are the two torsion springs 14 (the spring is shown in its wound state) that generate a torque on the hammer around hammer pivot 7 that tends to force the hammer in the latched position. The two torsion springs 14 (one is a mirror image of the other) fit in two special cavities on the hammer 16. Cavity 16 on the Hammer 5 contains the main body of the Torsion Spring 14 as well as one of its legs. The other leg sits on Special Bracket 15 on the primary frame. However, when the latch is in its unlatched position as shown in FIG. 5, the hammer is locked in its position by the Sheet Metal Hammer Lock 17. This part is a sheet metal component (preferably out of steel or spring steel) that is biased outwards and its edge interferes with areas of the Primary Frame 2, and thus prevents the hammer from rotating under the influence of the two Torsion Springs 14. Additionally, the Secondary Frame 3 is equipped with three Alignment Pins 4, the central of which is longer than the other two. When the user forces the two frames together, the longer central alignment pin 4 engages the Sheet Metal Hamer Lock 17 and compresses it inwards. The compressed sheet metal spring eventually is compressed sufficiently so that it no longer interferes with the area of the Primary Frame 2, and much like the hammer in a firearm trigger, the Hammer 5 is rapidly moved by the two Torsion Springs 14 into the latched position. Furthermore, the Primary Frame 2 is equipped with two Separation Springs 18 which are simple compression coil springs attached on the frame. The two external alignment pins 4 go through these springs, but the flat face of secondary Frame 3 compresses these springs as the user forces the two frames together. The purpose of these Separation Springs 18 becomes clear during the unlatching function of the latch. During that process, the user pulls the hammer manually (via Hammer Groove 11 also present in this embodiment) and the Separation Springs instantly generate a distance between the two frames. Then, the user forces the hammer (against the action of the Torsion Springs 14) into the unlatched position, and since the central alignment pin 14 has now been retracted, the Sheet Metal Hamer Lock 17 again locks the hammer in the unlatched position.

The embodiment of FIG. 5 has one additional important option. Referring again to FIG. 5, both frames 2 and 3 have stationary magnets 8 attached on them. These magnets help the user find the correct alignment position as he/she brings the two frames together. Therefore, even in situations where the user cannot clearly see the latch, the alignment can be nevertheless done without significant effort.

Figure 6:
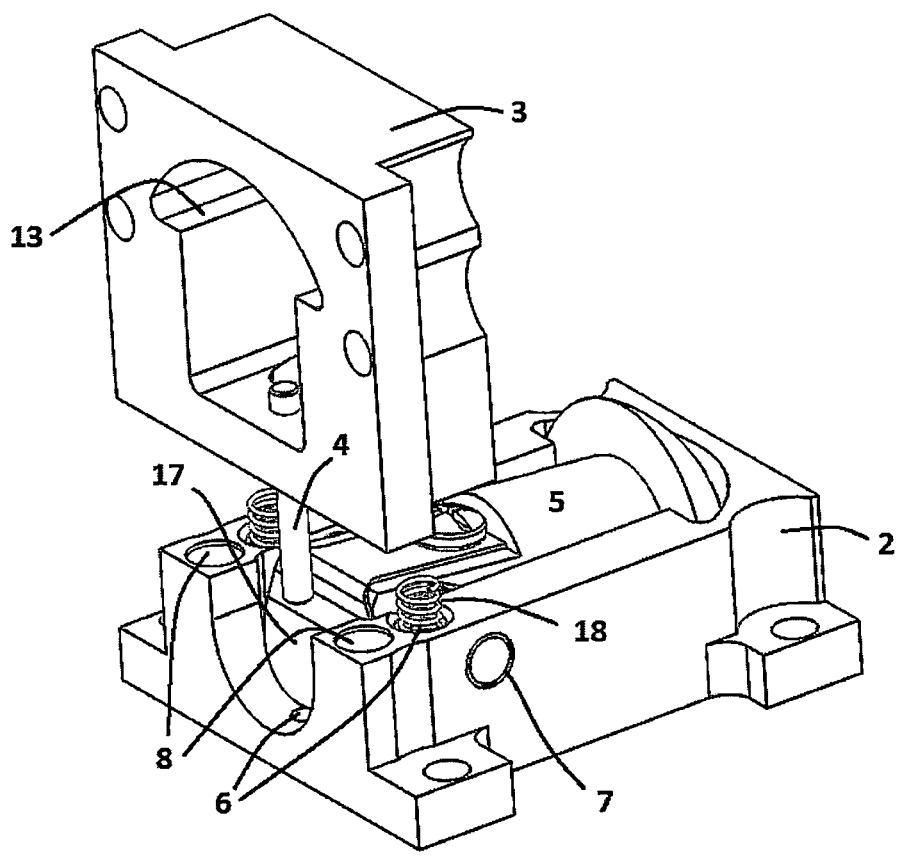
FIG. 6 shows the 90 degree automated latch with spring sheet metal lock and torsion springs.

FIG. 6 shows a similar concept to the embodiment of FIG. 5, but for the 90 degree latch. Again, two torsion springs (not visible in FIG. 6) are trying to rotate the hammer to the latched position, but again the Sheet Metal Lock 17 is preventing that until the user forces the three guide pins 4 (only central one visible from in FIG. 6) into the three guide holes 6, and in doing so the Sheet Metal Lock 17 is displaced, allowing the hammer to rotate into its latched position. Again, the unlatching process is similar, the user needing to rotate the hammer from the notch 11 on the hammer head (not visible in FIG. 16) and as soon as the hammer has moved away from flat 13 of Secondary Frame 3, the Separation Springs 18 will separate the two frames and allow the user to force the hammer into the unlatched position, and then the Sheet Metal Lock 17 will lock the hammer in that position.

The embodiment of FIG. 6 has one additional important option. Referring again to FIG. 6, both frames 2 and 3 have stationary magnets 8 attached on them (only the ones on the Primary Frame 2 are visible). These magnets help the user find the correct alignment position as he/she brings the two frames together. Therefore, even in situations where the user cannot clearly see the latch, the alignment can be nevertheless done without significant effort.

Figure 7:
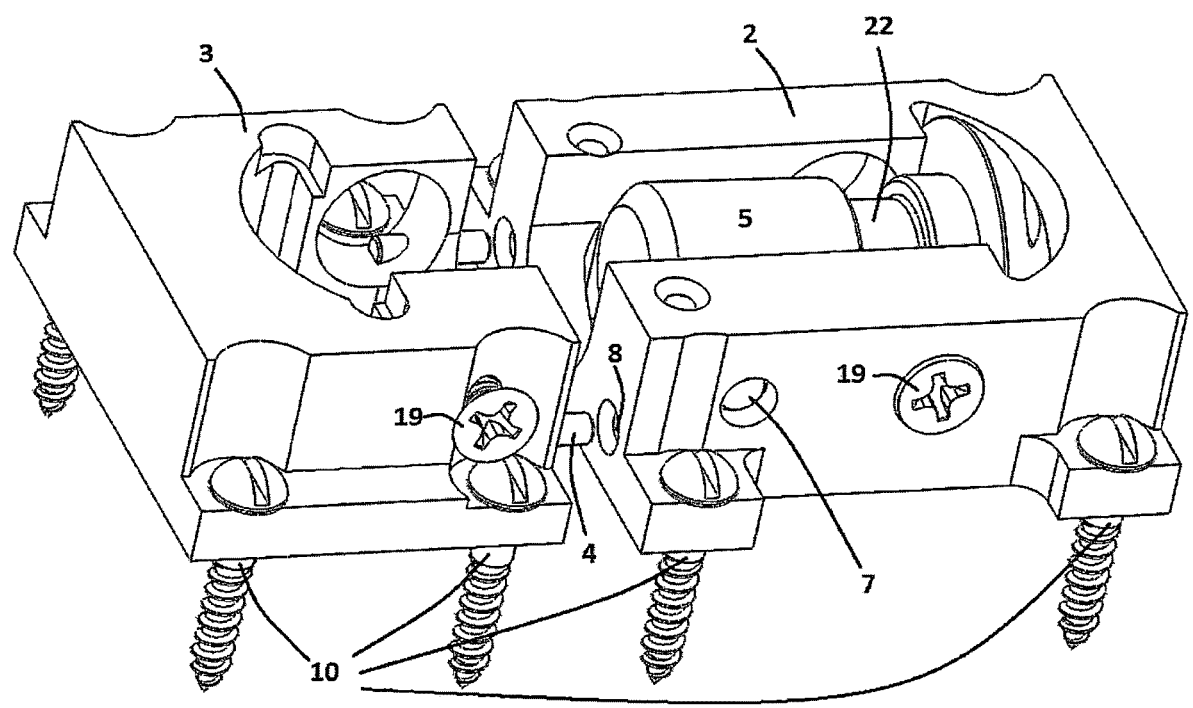
FIG. 7 shows the 180 degree manual latch with mechanical locks.
Figure 8:
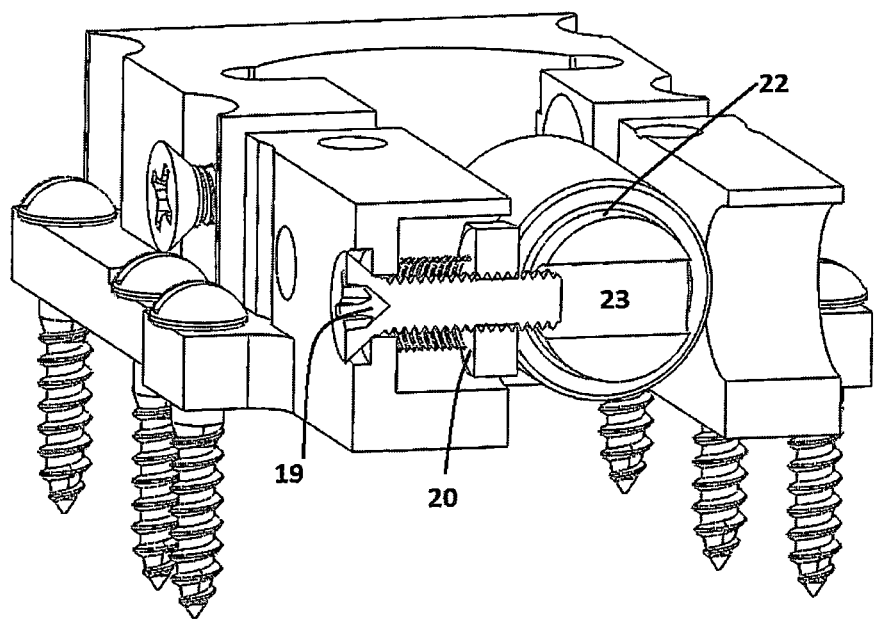
FIG. 8 shows a cross section of the latch of FIG. 7 in order to reveal the locking mechanism.

FIG. 7 shows another embodiment where the hammer movement is done by the user similarly to the manually operated one described earlier but the locking of the hammer is accomplished by mechanical means rather magnetically. Specifically, FIG. 7 shows the 180 degree latch in its unlatched position. All the major features, including the Primary Frame 2, the Secondary Frame 3, the Hammer 5, the alignment pins 4 (only two in this case), the alignment holes 8, the mounting bolts 10 are present. The hammer locking mechanisms for both latched and unlatched hammer locations are now mechanical. However, from FIG. 7, only two features of the locking mechanism are visible, the Locking Pin Bolt 19 and the Hammer Ramp 22. FIG. 8, however, shows a cross section of the same latch, revealing the remaining features of the mechanical locking mechanism, and its function. Locking Nut 20 is screwed into Locking Pin Bolt 19 up to a point in order to compress the Locking Spring 24. As the hammer is moved into position by the user, the Hammer Ramp 22 engages Locking Pin Bolt 19 and compresses the Locking Spring 24 further in order to push the Locking Pin Bolt 19 out of the way. Eventually, the Hammer Locking Hole 23 will reach the Locking Pin Bolt 19 and the spring will insert the latter into the hole. This will complete the locking process. FIG. 8 shows locking into the unlatched position, but the process and features are identical for the latched position. In order for the hammer to be unlocked and moved, the Locking Pin Bolt 19 will have to be pulled out by the user while the user also is moving the hammer. It needs to be noted that the Locking Pin Bolt 19 does not necessarily need to be a bolt, and the Locking Nut does not have to be a threaded nut. Any type of pin that a flange can be secured to provide the reaction on the compression spring 24 will work. A bolt and nut is used here simply due to their availability.

A similar embodiment to the one shown in FIGS. 7 and 8 can also be fabricated, but for a 90 degree latch. In fact, the components described in FIGS. 7 and 8 can be used with little or no modification for the 90 degree latch as additional alignment holes and pin holes are provided. It is assumed that the embodiment is obvious, and therefore no additional figures are provided to illustrate this.

The embodiment of FIG. 7 has one additional important option. Both frames 2 and 3 have stationary magnets 8 attached on them (not shown in FIG. 7 but similar to the ones shown in FIG. 5). These magnets help the user find the correct alignment position as he/she brings the two frames together. Therefore, even in situations where the user cannot clearly see the latch, the alignment can be nevertheless done without significant effort.

Figure 9:
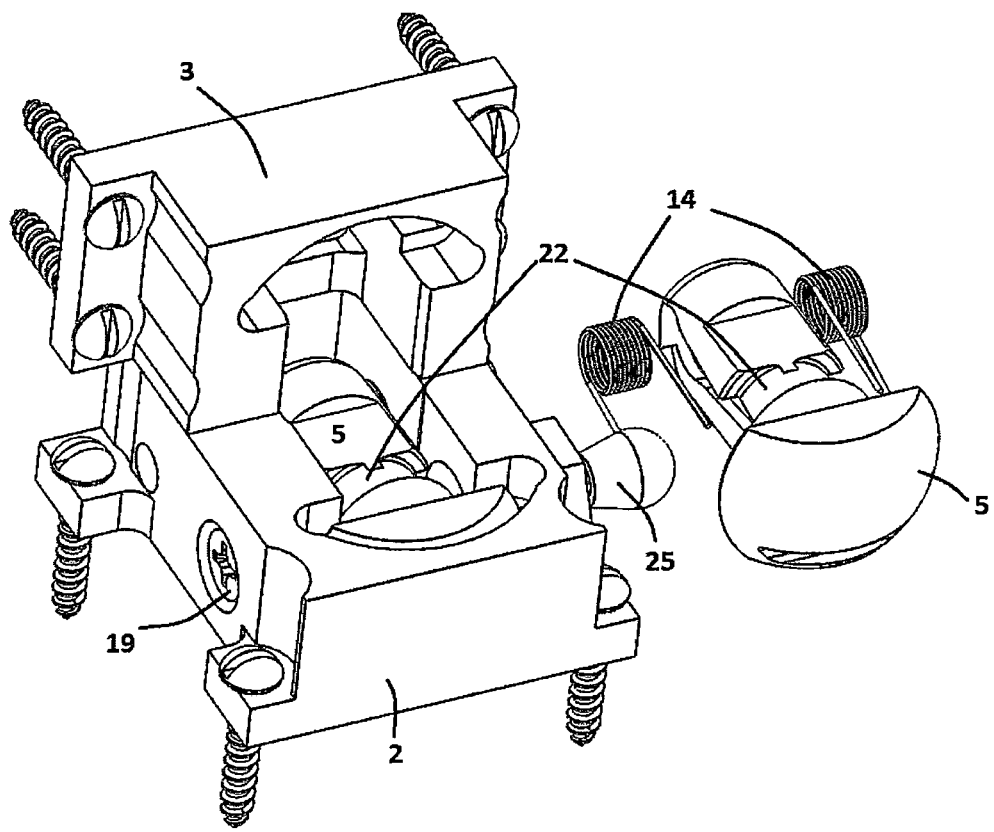
FIG. 9 shows the 90 degree automated latch with ergonomically efficient mechanical lock and torsion springs for the hammer.
Figure 10:
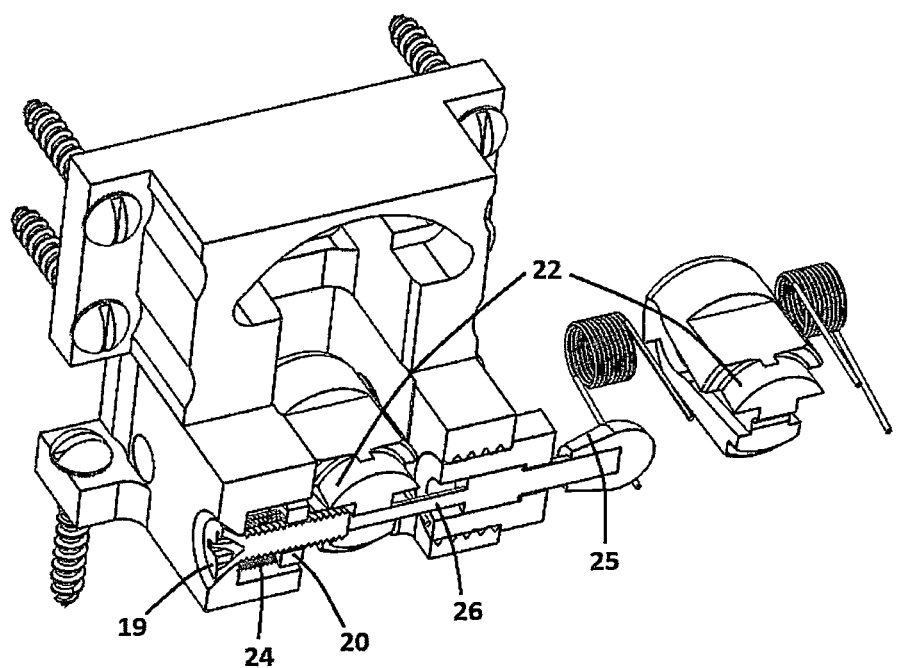
FIG. 10 shows a cross section of the Latch of FIG. 9 in order to reveal the ergonomically efficient locking mechanism.

FIG. 9 is an embodiment that combines the features of the embodiment shown in FIG. 5 (where the hammer is activated by torsion springs) and features of the embodiment shown in FIG. 7 (mechanical locking method). FIG. 9, that shows the latch in its unlatched position, also illustrates an additional Hammer 5 and an additional set of Torsion Springs 14 outside of the main assembly in order to illustrate the concept. The torsion springs 14 (shown in their wound state) are applying a torque on Hammer 5 that is trying to rotate the hammer into the latched position. However, the locking mechanism, with Locking Pin Bolt 19 and other components that are not visible in FIG. 9 prevent the hammer from moving. FIG. 10 shows a cross section of the mechanism of FIG. 9 right on the center plane of the locking mechanism. Again, Spring 24 and Nut 20 keep the Pin Bolt 19 biased to the right (as seen in FIG. 10), forcing the Pin Bolt 19 edge inside a special cavity in Hammer 5 (not visible from FIG. 10) preventing its release. The user is still expected to align the Alignment Pins 4 with Alignment Holes 6 and mate the pins in the holes (not visible, FIG. 9 assumes shows the latch right after this step is completed). One addition of the embodiment of FIGS. 9 and 10 is that the release of the hammer is now easier since the user just needs to depress Release Button 25 which causes Release Pin 26 to move to the left and push Locking Pin Bolt 19 out of the way, releasing the hammer. This extra complication allows for a more ergonomic hammer release than the one shown in the embodiment of FIGS. 7 and 8, but the hammer release could certainly be the simpler version of FIGS. 7 and 8. When the user depresses Release Button 25, the hammer is automatically rotated into the latched position. When the user needs to unlatch it, the procedure and mechanism is similar to the embodiment of FIGS. 7 and 8. The Hammer Ramp 22 again will push the Pin Bolt 19 out of the way temporarily and allow the hammer to retract until the Spring 24 forces the Locking Pin Bolt 19 in the locked position.

Figure 11:
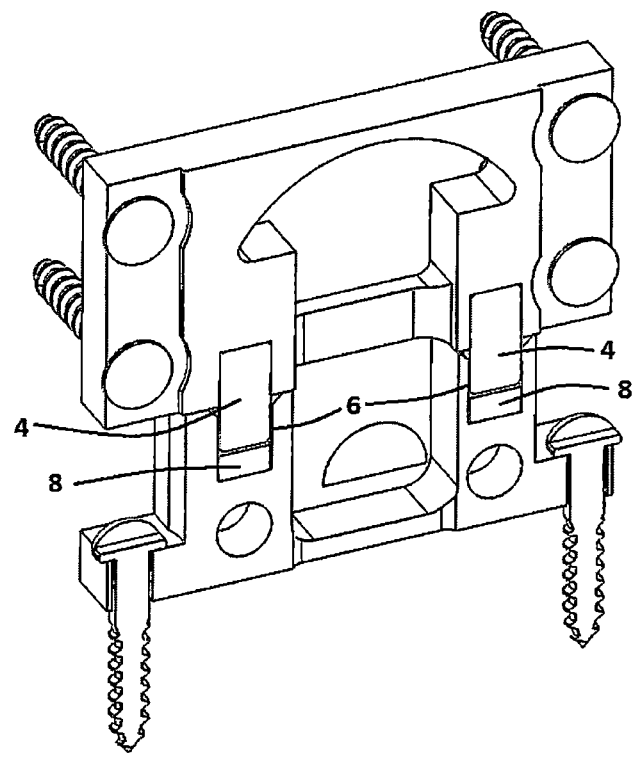
FIG. 11 shows an alternative magnetic guidance for alignment pins via a cross section, in this case as applied to the latch of FIG. 9.

FIG. 11 shows an additional option for the embodiment of FIGS. 9 and 10. FIG. 10 shows a cross section along the plane of the Alignment Pins 4 and Alignment Pins 6. In this embodiment, stationary magnets 8 are secured in the bottom of Alignment Holes 6, which allow the easy alignment of the pins and holes. This approach requires that the Alignment Pins 4 are built from a magnetic material such as steel.

Figure 12:
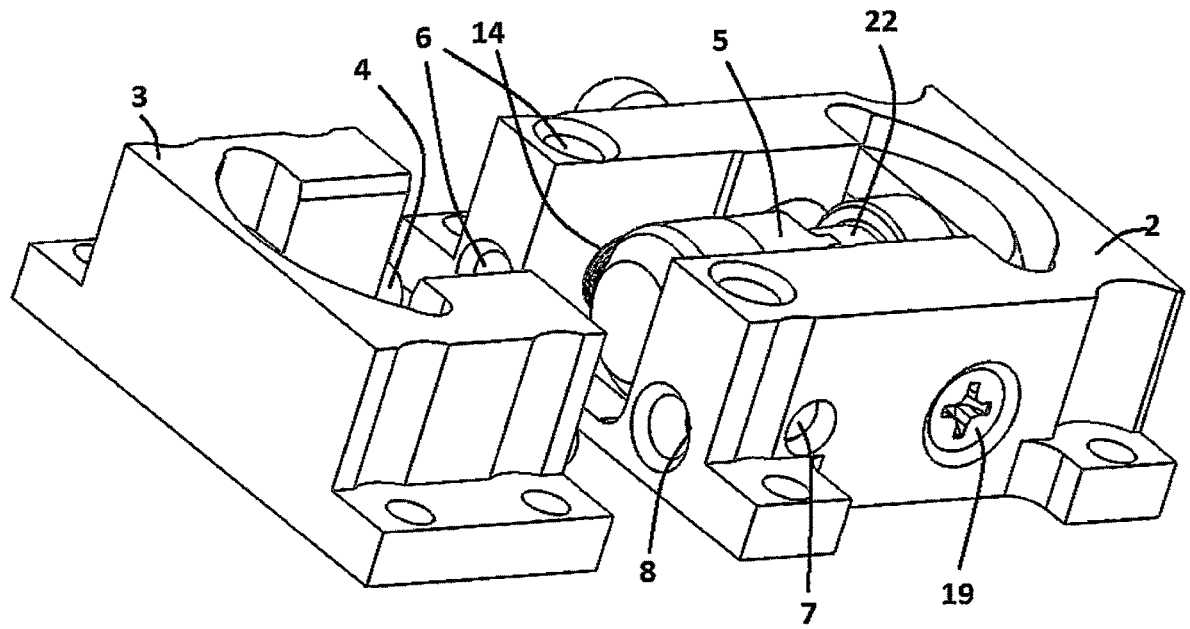
FIG. 12 shows the 180 degree automated latch with ergonomically efficient mechanical lock ad torsion springs for the hammer

FIG. 12 shows the latch mechanism of FIG. 9 but for a 180 degree latch. All the features are identical to the Latch of FIG. 9, except for the fact that the latch mechanism is engaged at 180 degrees. One of the magnetic assistance Stationary Magnet 8 is barely visible from the angle of FIG. 9. One novelty of the parts shown in FIG. 9 is that the same parts can be used for both a 90 degree and a 180 degree latch. Therefore, additional or redundant alignment holes 6 are present in FIG. 12, but the reason of the redundancy is if the part is used for a 90 degree latching purpose. This option of double use can apply to the latch mechanisms presented, and a benefit is that the logistical cost of providing different parts for different needs can be eliminated or minimized.

In FIGS. 1, 2, 3, and 4, the mounting screws 10 are shown and labeled. However, mounting screws is not the only way that the latches can be secured on the panels. Epoxy resin can be used to secure the latch frames on the brackets instead. A benefit of this is that the installation brackets are not needed, giving the frames a cleaner look and also reducing their necessary foot print size on the panels.

In an embodiment, frames or assemblies may be used to join panels at angles of either 90 degrees or 180 degrees. At 90 degrees, the panels are at right angles to each other. At 180 degrees, the panels are adjacent and facing the same direction with their edges abutting and flush with one another.

The two assemblies comprise a dowel pin assembly and a hammer assembly. The dowel pin assembly has two pins jutting outward that insert into holes in the hammer assembly. The hammer assembly has a rotating hammer attached to it that swings or rotates over and comes to rest in a recessed area of the dowel pin assembly, fortifying the connection of the assemblies and therefore the panels. Magnets in the hammer and in the recessed area of the dowel pin assembly attract and further strengthen to connection. In embodiments, instead of two magnets attracting and joining in the structures described above, a combination of magnet and steel plate are used. The magnets and/or steel plates may be completely or partially embedded into their respective assembly.

The two assemblies may be semicircular in shape with their straight edges parallel to and positioned along or near the edges of their respective panels. The assemblies may be embedded into their respective panels such that their upper facing surfaces are flush with the surfaces of the panels, promoting a smoother and more attractive surface.

The two steel dowel pins protrude from a surface of the dowel pin assembly that makes contact with the hammer assembly. The steel pins insert fully into corresponding holes in the hammer assembly.

When the panels are to be joined at 90-degree angles, the holes in the hammer assembly are on the top surface of the hammer assembly and face upward, assuming a first panel hosting the hammer assembly is lying flat and horizontal, for example on a surface of a table or bench. As the other or second panel with its hosted dowel pin assembly is positioned at a 90-degree angle and vertical to the horizontal panel hosting the hammer assembly, the dowel pins protruding from the dowel pin assembly point downward. The dowel pins are inserted into the holes on the top and upward facing surface of the hammer assembly. Downward pressure exerted on the second and vertical panel gently forces the dowel pins fully into the holes. Thereafter the hammer may be rotated 90 degrees such that it enters a recessed area of the dowel pin assembly. The magnet in the head of the hammer and the magnet embedded into the recessed area of the dowel pin assembly attract to each other and further bind the two assemblies and their associated panels.

In an embodiment, once the above process is complete, covers may be placed over the two assemblies now firmly joined at the 90-degree angle. The covers conceal the two assemblies and particularly the hammer. The covers provide a more aesthetically attractive appearance to the joined pair of assemblies. The covers may be removed if the two panels need to subsequently be disconnected.

When the panels are to be joined at 180-degree angles such that they are adjoining at their edges and both flat and horizontal, the process for attachment is similar. A primary difference with the structure of the 90-degree embodiment described above is that the two holes on the hammer assembly are on an edge panel of the hammer assembly as opposed to being on the top surface as described above.

With the 180-degree embodiment, the holes are on the panel of the hammer assembly that corresponds to an end panel of the dowel pin assembly from which the two steel pins protrude. The two end panels of the respective assemblies may be placed for joining in a face-to-face manner on a horizontal surface such as a tabletop or surface of a work bench. The steel pins in the 180-degree structure face sideways instead of downward. As previously, the pins face the two holes in the hammer assembly which in the 180-degree structure are on the end panel of the hammer assembly and face sideways toward the pons. Sideways or horizontal pressure may be exerted against the two flat panels as they are moved toward each other. The horizontally facing pins of the dowel assembly enter the horizontally facing holes of the hammer assembly. Further pressure causes the pins to be fully inserted into the holes. The two edges of the panels may now be fully flush with each other. The two assemblies are also fully flush in their adjacent (as opposed to perpendicular) positions.

As with the 90-degree structure, the hammer in the hammer assembly may then be fully rotated, in this instance 180 degrees, such that the hammer securely enters the recessed area of the dowel pin assembly. As previously, magnets in the hammer and in the dowel pin assembly attract and further support the connection. As with the 90-degree structure, covers may be placed over the fully installed assemblies.

In embodiments, the dowel pin assembly is the same for both the 90-degree and the 180-degree structure. With the hammer assembly, the two holes are on a top surface or on an end panel depending on whether the application is for the 90-degree structure or the 180-degree structure, respectively.

The two assemblies in most embodiments would be embedded into their respective panels. This configuration allows the panels to be fully flush with one another when the attachment and joining processes described above for the two structures are complete. Assuming the two panels are made of wood, particle board, or similar material, drilling tools may be used to create recessed areas at the edges of the panels wherein the assemblies may be placed. Once placed there, the assemblies may be affixed into the recessed areas with screws after pilot holes have been drilled into the recessed areas. If the panels are made of metal, plastic, composite, or another material that may not be as permeable as wood or similar materials, other methods may be used to create the recesses and affix the assemblies into the recesses.

In many embodiments, more than one pair of the assemblies will be used to join panels in either the 90-degree or 180-degree structure. Two or more pairs may provide more support for the joined panels than merely a single pair of the assemblies.

Figure 13:
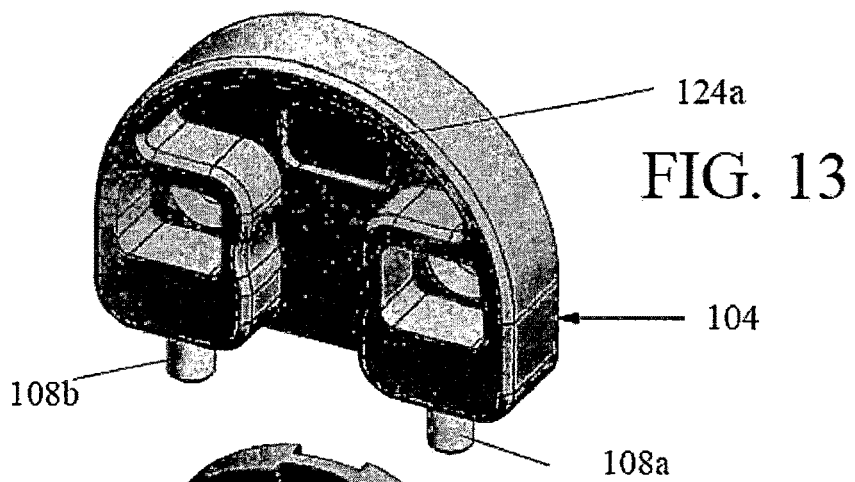
FIG. 13 is a diagram of a frame dowel pin assembly according to an embodiment of the present disclosure.

Turning to additional figures, FIG. 13 is a diagram of a dowel pin assembly in accordance with an embodiment of the present disclosure and in connection with this continuation-in-part application. For FIG. 13 through FIG. 42 and discussion henceforth, the 90-degree structure described above may referred to as the 90° L™ or simply 90L and the 180-degree structure may be referred to as the 180° D™ or simply 180D. These two products may be referred to commercially as the 90° L™ and the 180°D™

Figure 14:
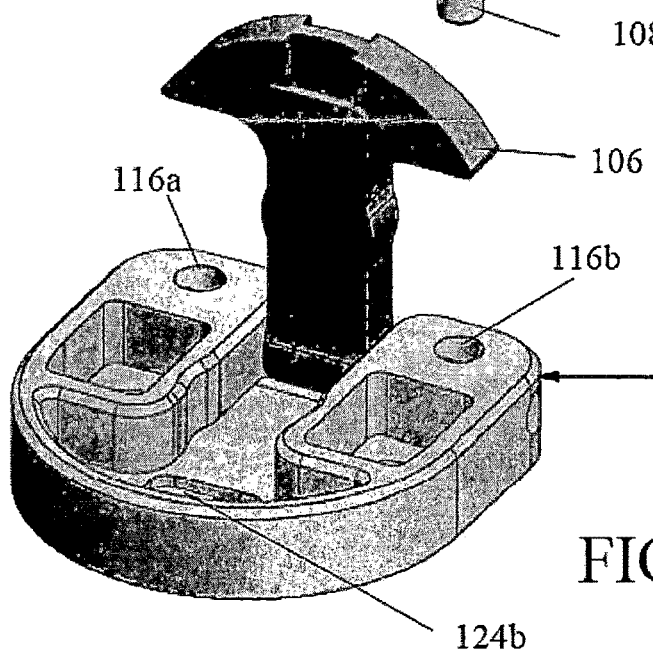
FIG. 14 is a diagram of a frame hammer assembly according to an embodiment of the present disclosure.
Figure 15:
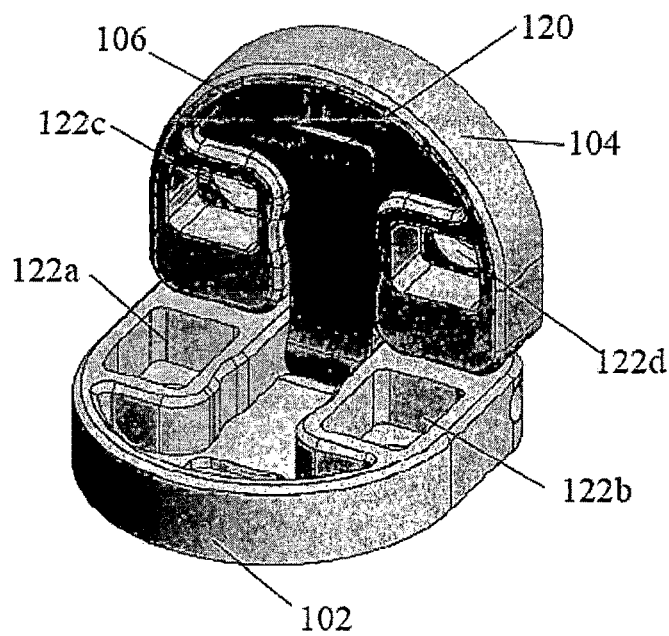
FIG. 15 is a diagram of a frame dowel pin assembly and a frame hammer assembly according to an embodiment of the present disclosure.

Further, for FIG. 13 through FIG. 42 and discussion henceforth, components of both the 90L and the 180D are as follows:
frame hammer assembly 102
frame dowel pin assembly 104
hammer 106
dowel pins 108a-b
frame magnet 110
hinge pin 112
hammer magnet 114
top alignment holes 116a-b
end alignment holes 118a-b
hammer handle 120
screws slots 122a-d
hammer slots 124a-b The structure of the 90L is demonstrated in FIG. 13 through FIG. 13. The dowel pin assembly 104 is shown in FIG. 13 with dowel pins 108a-b protruding downward as described above. The frame hammer assembly 102 is shown in FIG. 14 with top alignment holes 116a-b pointing upward. FIG. 14 also shows the hammer 106 in its rotated and upward position. FIG. 15 depicts the two assemblies 102, 104 after they have been joined with the dowel pins 108a-b fully inserted into the top alignment holes 116a-b.

Figure 16:
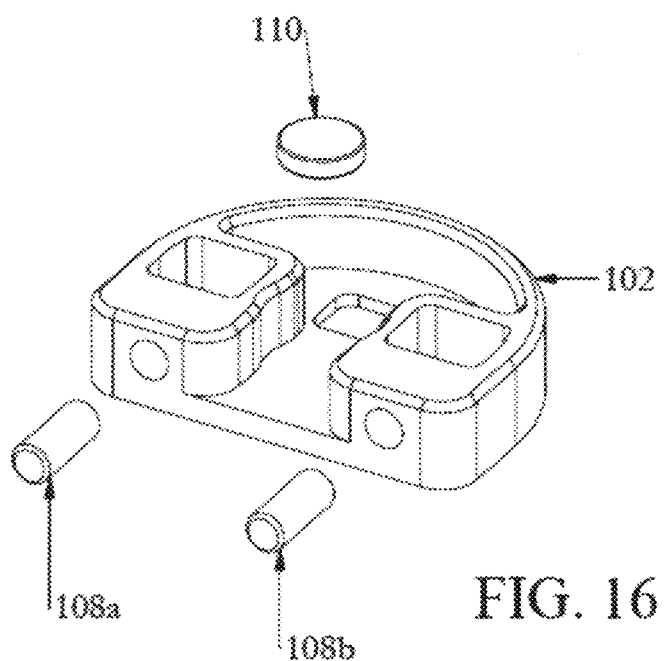
FIG. 16 is a diagram of a frame dowel pin assembly according to an embodiment of the present disclosure.
Figure 17:
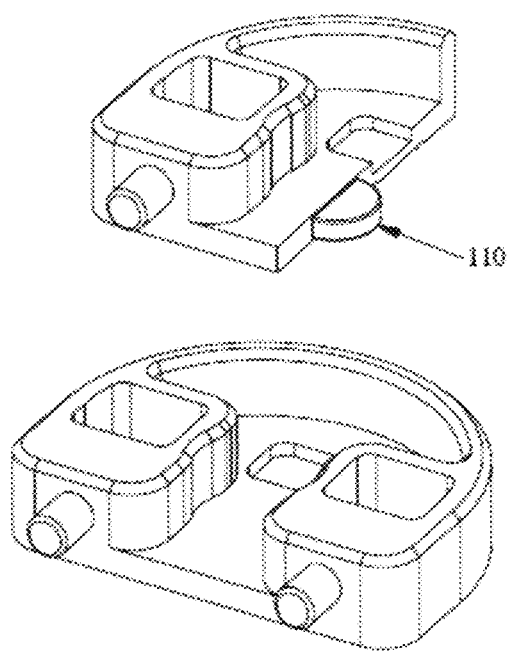
FIG. 17 is a diagram of a frame dowel pin assembly according to an embodiment of the present disclosure.
Figure 20:
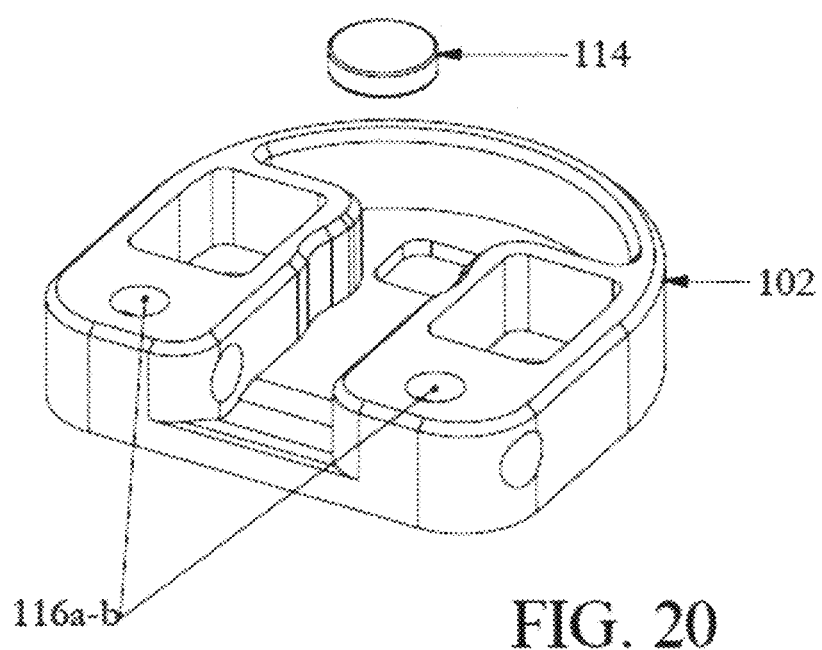
FIG. 20 is a diagram of a frame hammer assembly according to an embodiment of the present disclosure.

FIG. 16 and FIG. 17 illustrate the dowel pin assembly 104 with the dowel pins 108a-b shown outside the assembly 104 in FIG. 16 and installed in the assembly 104 in FIG. 17. The frame magnet 110 is also shown in both FIG. 16 and FIG. 17.

The frame magnet 110 is physically embedded into the body of the assembly 104 as shown in FIG. 17.

FIG. 18 through FIG. 21 illustrate the frame hammer assembly 102 with the hinge pin 112 shown in FIG. 18. The hinge pin 112 is used to hold the hammer 106. The hammer magnet 114 is also depicted and is used to hold the hammer 106 secure in the frame hammer assembly 102 when it is stowed in the assembly 102 and not rotated over into the dowel pin assembly 104 during use. It should be noted that the top alignment holes 116a-b are present in the frame hammer assembly 102 indicating that this particular version of the assembly 102 is appropriate for use with the 90L and not the 180D. FIG. 22 shows the hammer 106 and the hammer magnet 114 that may be embedded into the hammer 106.

FIG. 23 through FIG. 25 apply to the 180D or 180-degree structure where panels are flat and adjacent to one another. With the 180D, the dowel pin assembly 104 is the same as with the 90L but the frame hammer assembly 102 is different with the end alignment holes 118a-b in effect as opposed to the top alignment holes 116a-b. The end alignment holes 118a-b are not shown in FIG. 23 through FIG. 25 because the frame hammer assembly 102 is facing away from the viewer. The two assemblies 102, 104 are shown as joined in FIG. 25. In FIG. 25, it should be noted that the hammer 106 has not yet been rotated 180 degrees over to be situated into the recessed area of the dowel pin assembly. This action would normally take place after the two assemblies 102, 104 have been joined.

Figure 27:
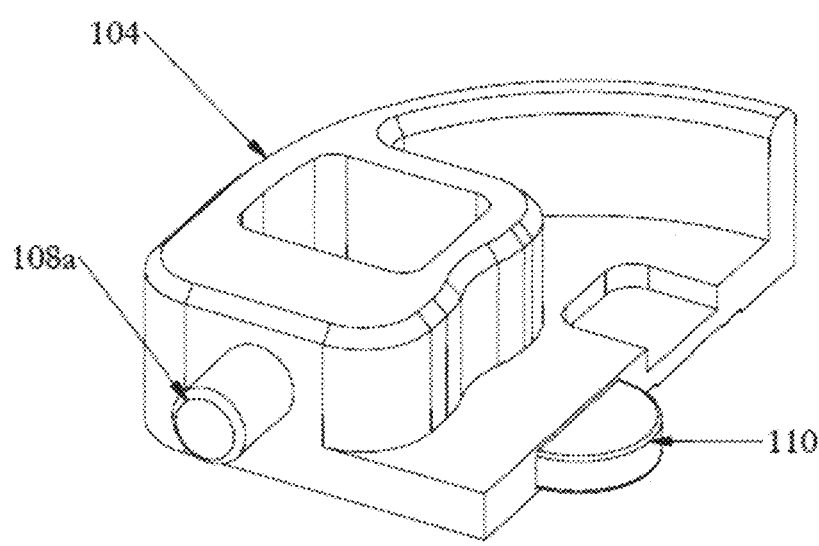
FIG. 27 is a diagram of a frame dowel pin assembly according to an embodiment of the present disclosure.
Figure 30:
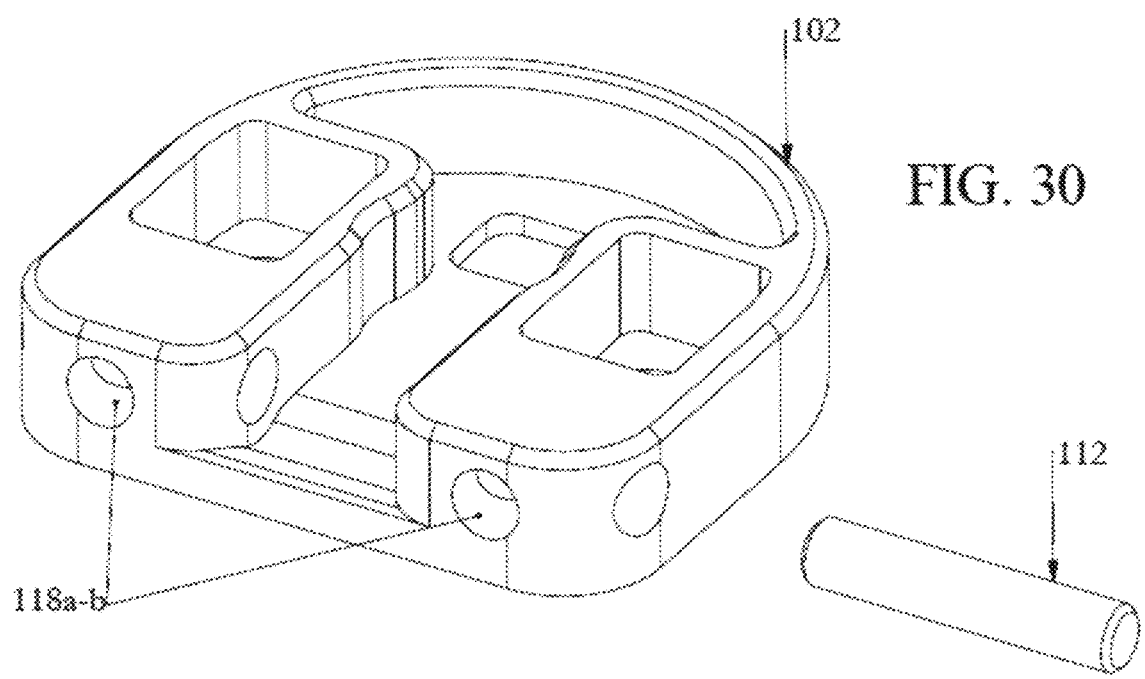
FIG. 30 is a diagram of a frame hammer assembly according to an embodiment of the present disclosure.
Figure 31:
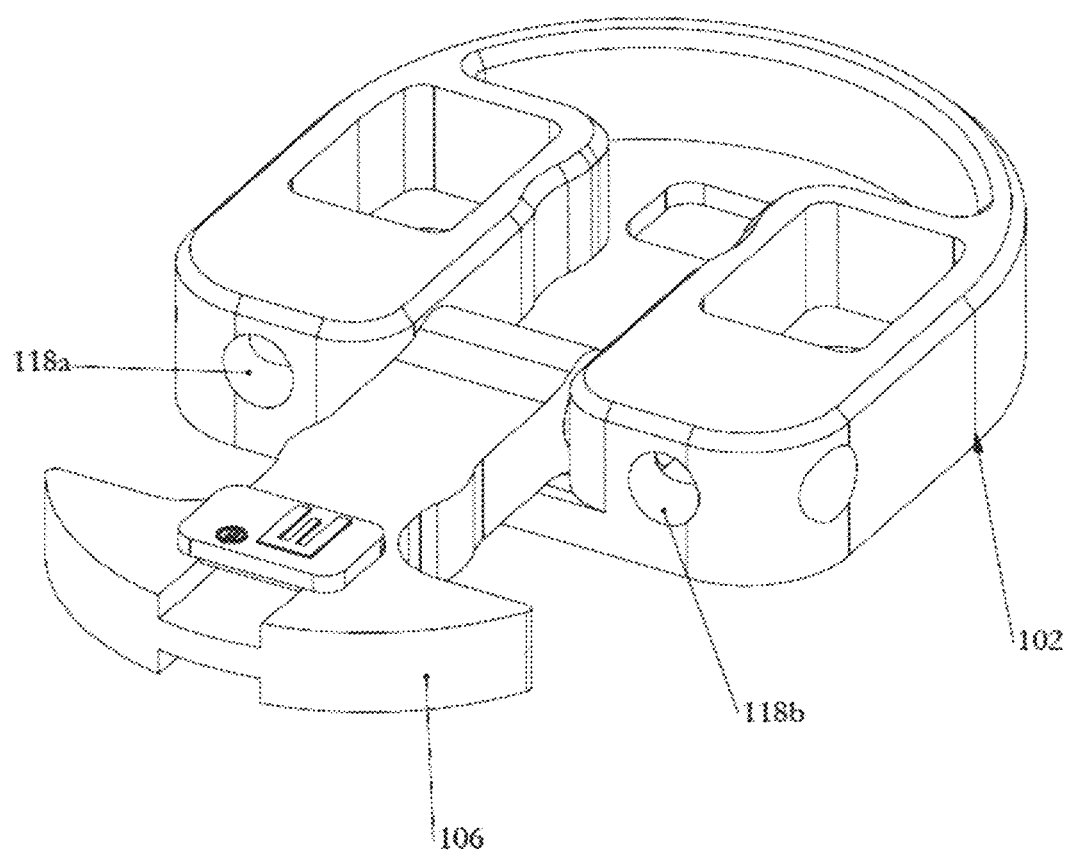
FIG. 31 is a diagram of a frame hammer assembly according to an embodiment of the present disclosure.
Figure 32:
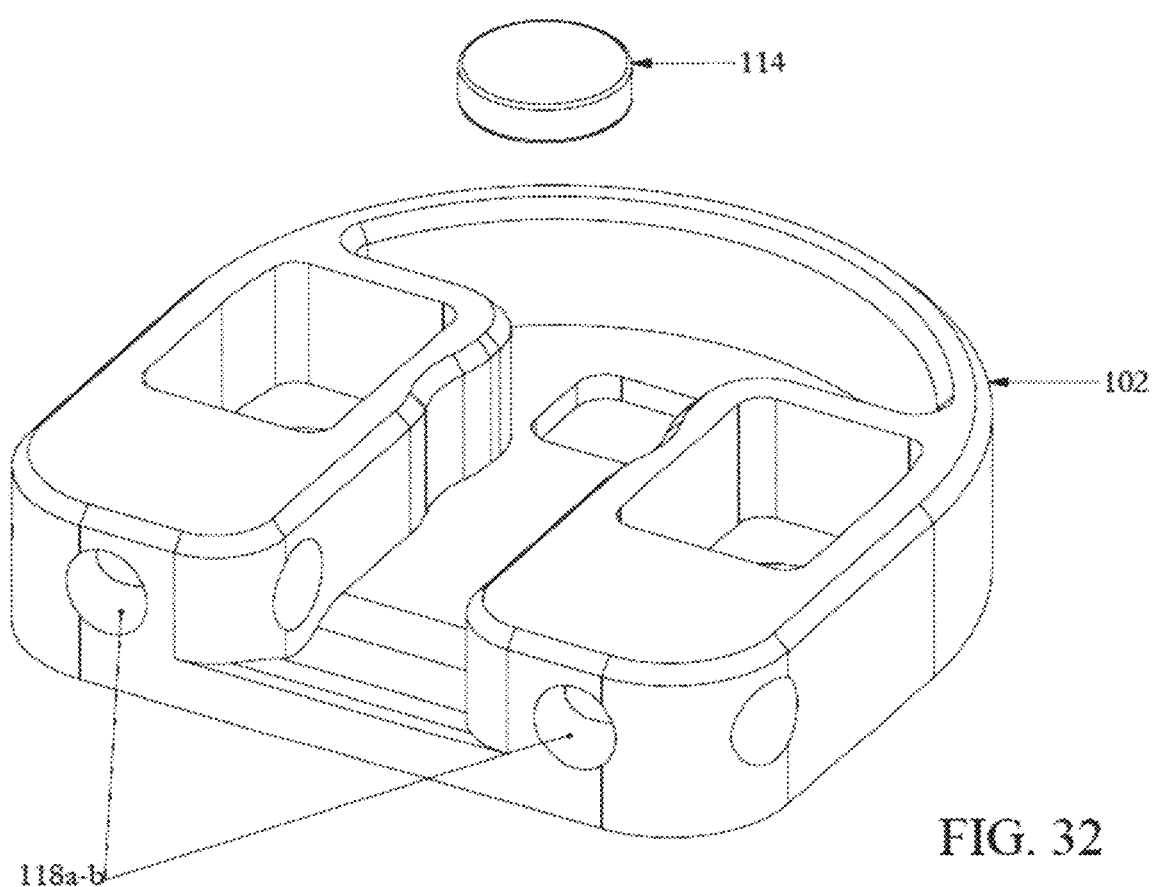
FIG. 32 is a diagram of a frame hammer assembly according to an embodiment of the present disclosure.
Figure 33:
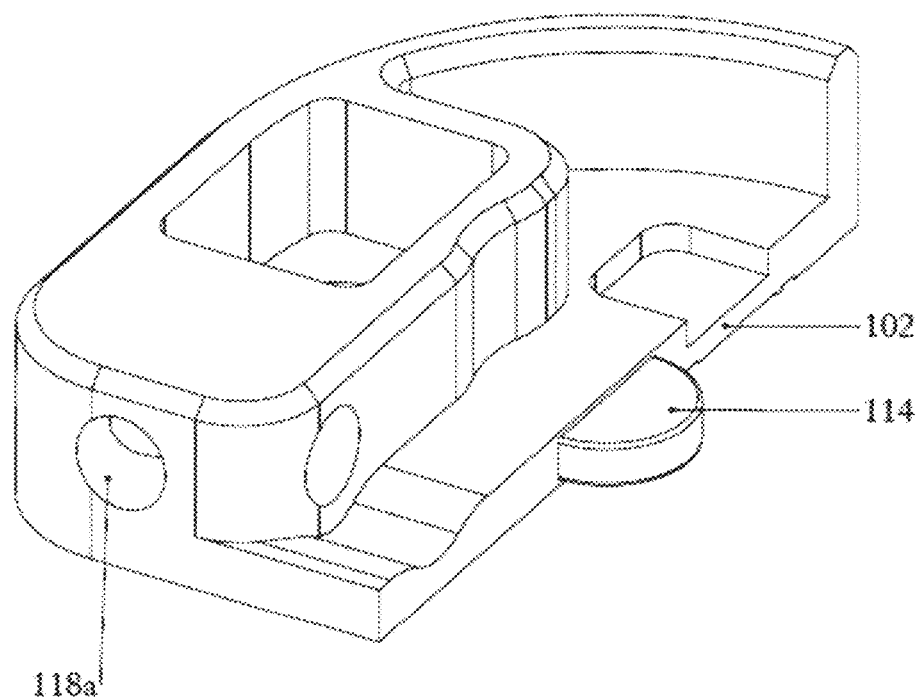
FIG. 33 is a diagram of a frame hammer assembly according to an embodiment of the present disclosure.
Figure 34:
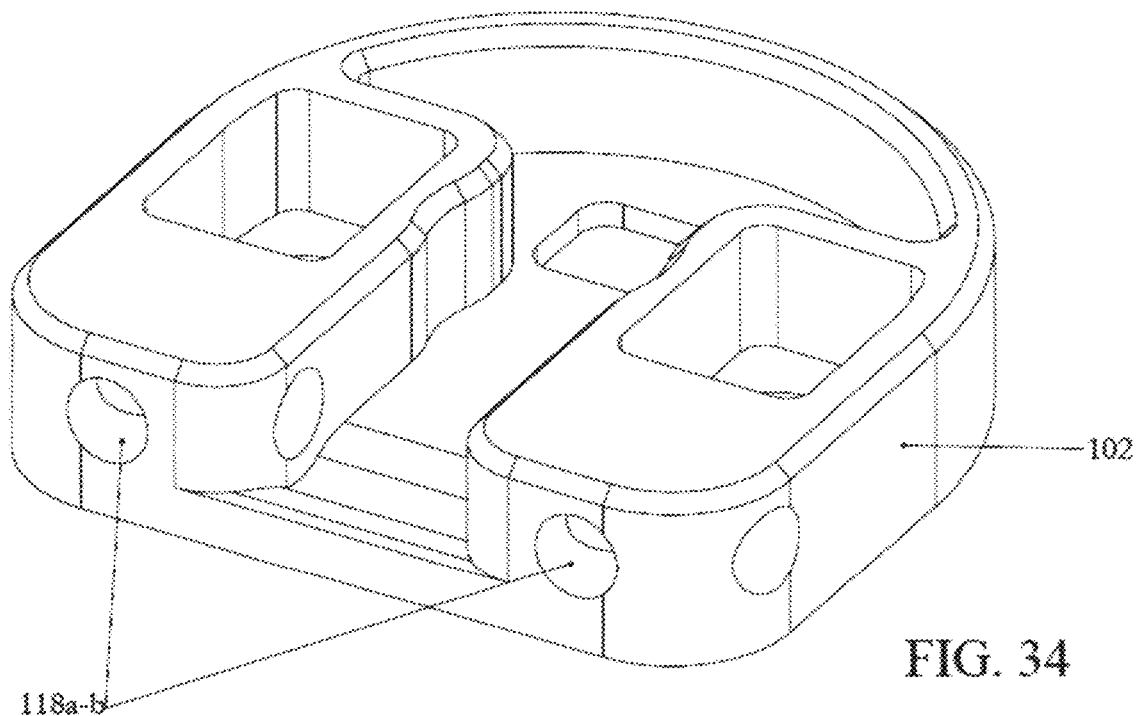
FIG. 34 is a diagram of a frame hammer assembly according to an embodiment of the present disclosure.

FIG. 26 through FIG. 28 are images of the frame dowel pin assembly 104. FIG. 29 through FIG. 34 are images of the frame hammer assembly 102 for use with the 180D as the end alignment holes 118a-b are shown.

Figure 35:
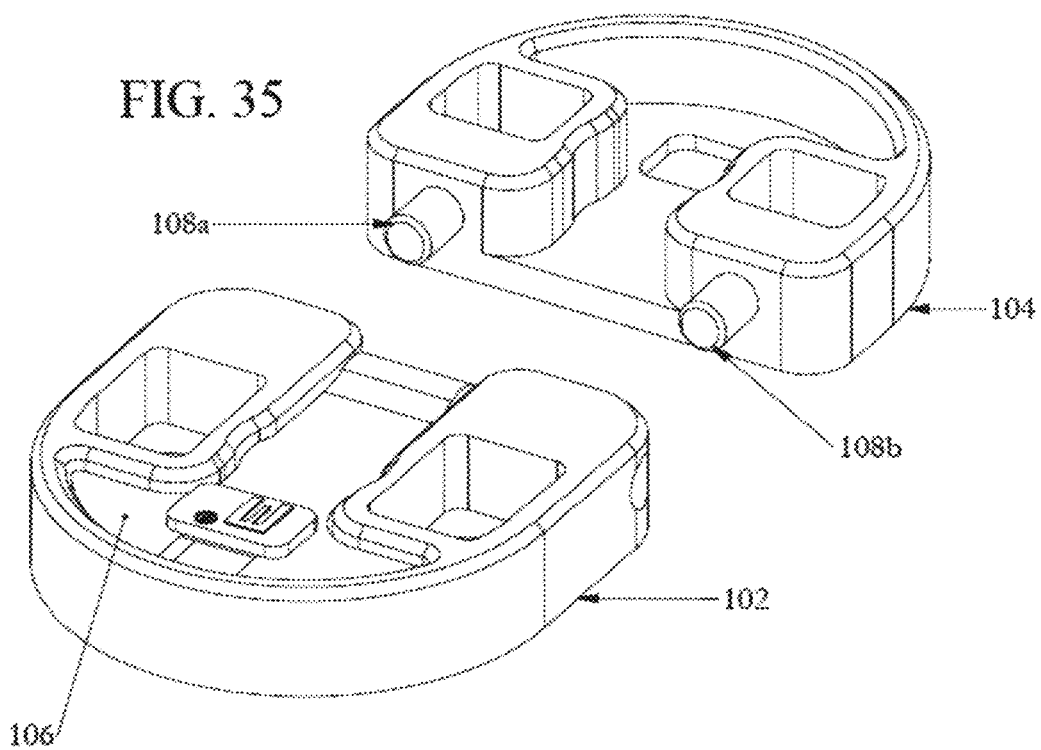
FIG. 35 is a diagram of a frame dowel pin assembly and a frame hammer assembly according to an embodiment of the present disclosure.

FIG. 35 shows the two assemblies 102, 104 prior to being joined in the 180D structure. The frame hammer assembly 102 shown is for use with the 180D as the end alignment holes 118a-b are present (but not shown). 9

Figure 36:
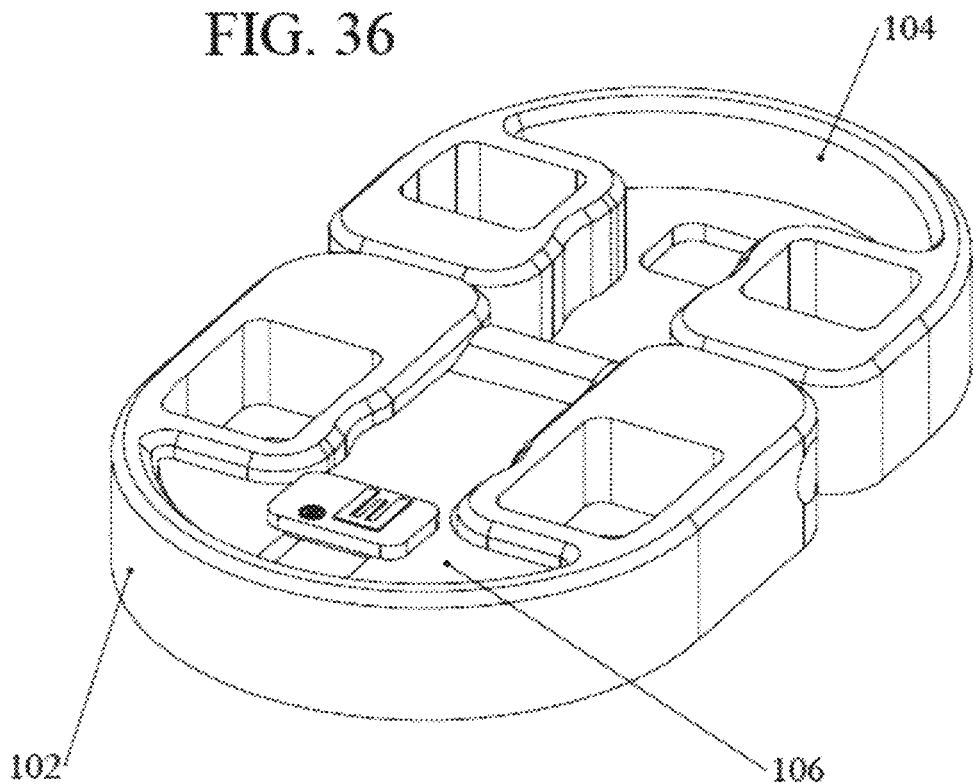
FIG. 36 is a diagram of a frame dowel pin assembly and a frame hammer assembly according to an embodiment of the present disclosure.

FIG. 36 depicts the two assemblies 102, 104 joined in the 180D structure. But as with FIG. 25, the hammer 106 has not yet been rotated.

Figure 37:
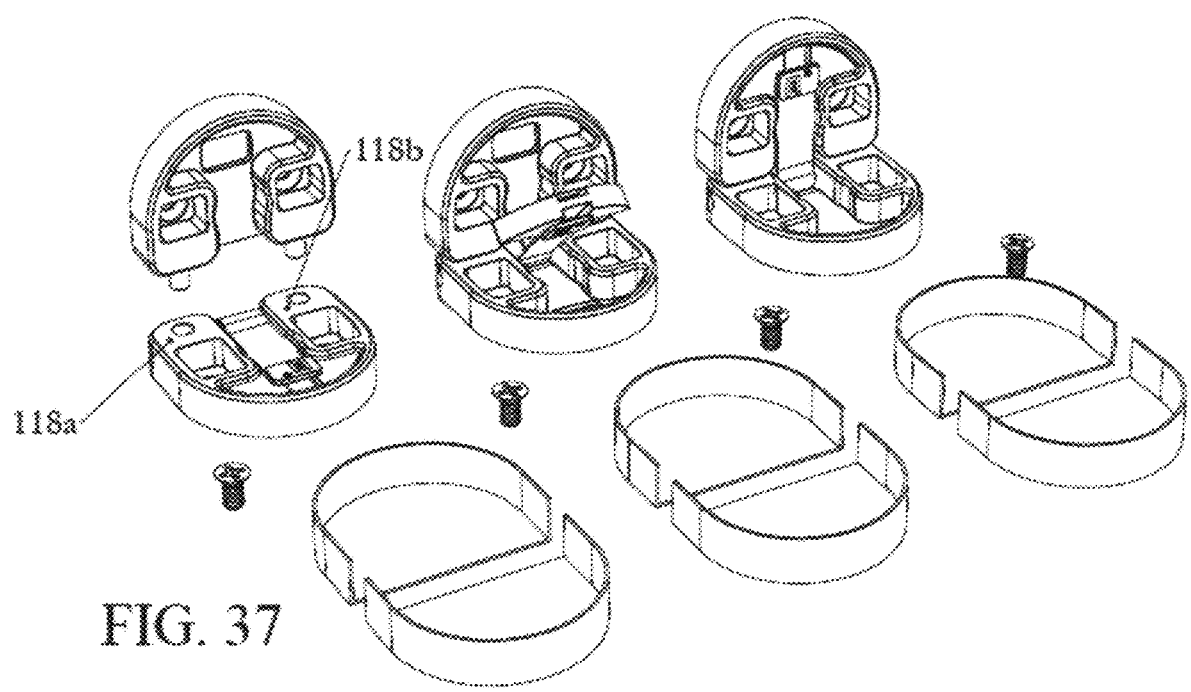
FIG. 37 is a diagram of a frame dowel pin assembly and a frame hammer assembly according to an embodiment of the present disclosure.
Figure 38:
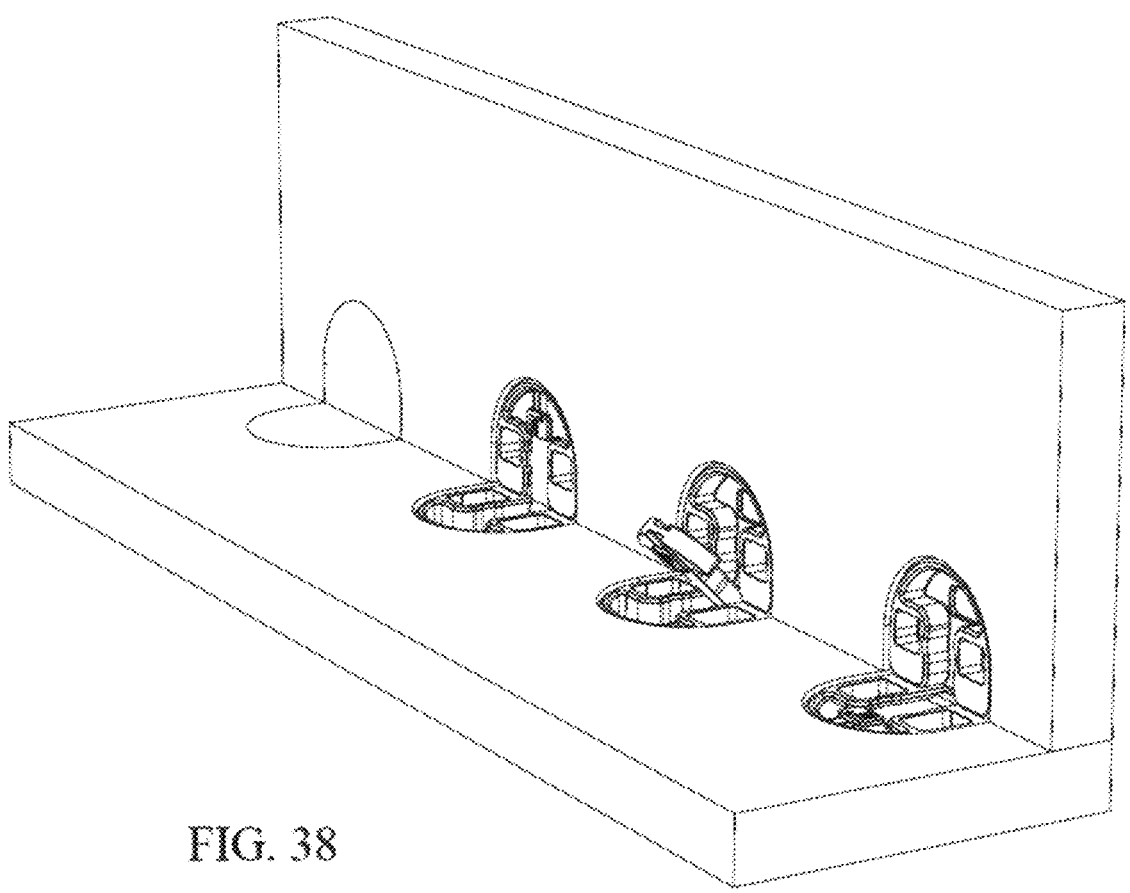
FIG. 38 is a diagram of a frame dowel pin assembly and a frame hammer assembly according to an embodiment of the present disclosure.

FIG. 37 depicts the components of the 90L structure. The top alignment holes 116a-b are pointed out in FIG. 37. FIG. 38 shows the 90L structure installed in two panels at 90-degree angles. As noted, it is commonplace to use more than a single pair of the assemblies 102, 104 when joining panels. FIG. 39 provides two charts depicting technical specifications and applications of the 90L.

Figure 40:
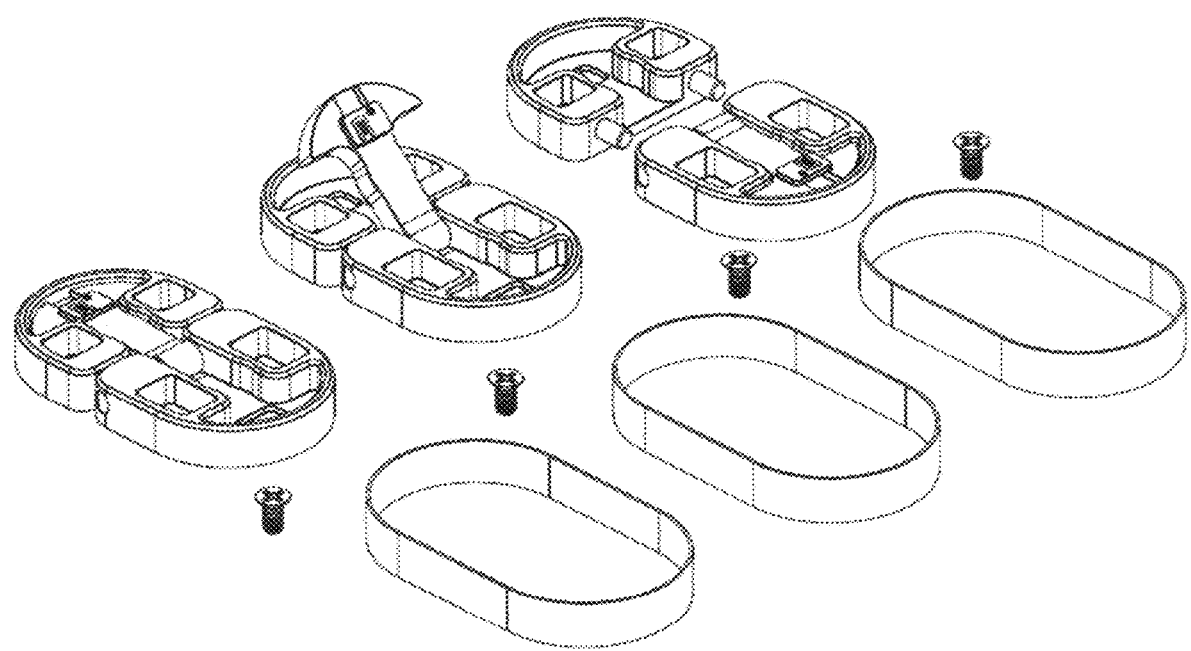
FIG. 40 is a diagram of a frame dowel pin assembly and a frame hammer assembly according to an embodiment of the present disclosure.
Figure 41:
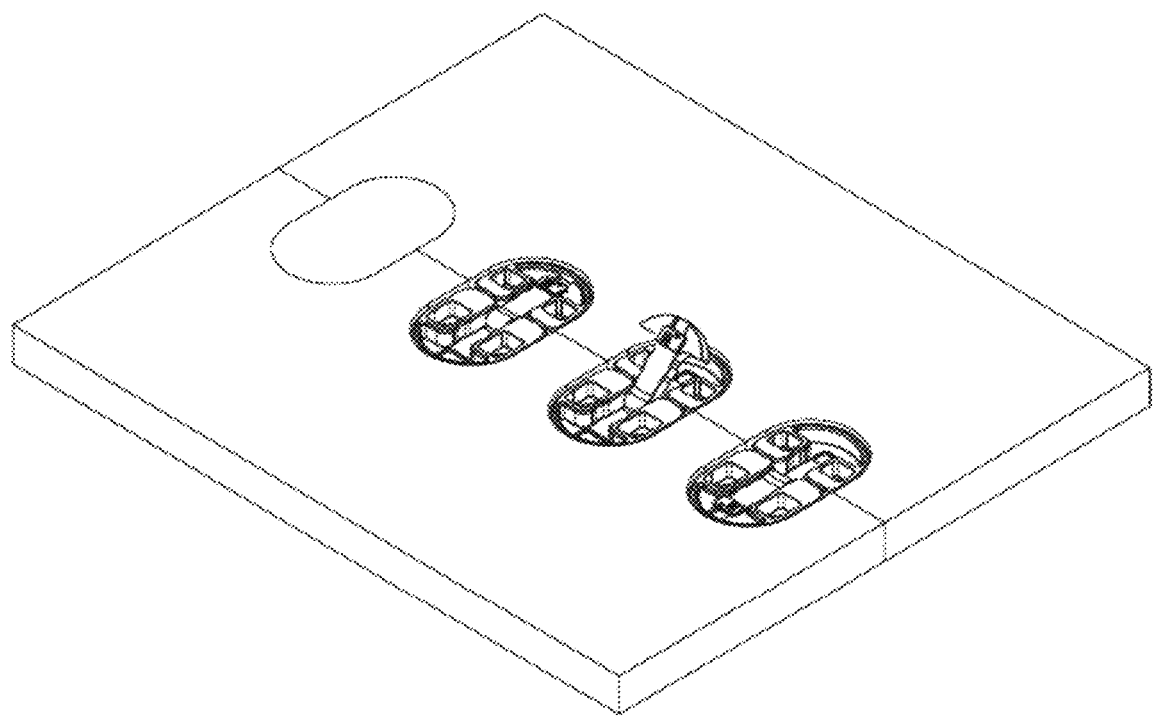
FIG. 41 is a diagram of a frame dowel pin assembly and a frame hammer assembly according to an embodiment of the present disclosure.

FIG. 40 depicts the components of the 180D structure. FIG. 41 depicts the components of the 180D installed into adjacent panels as described above. FIG. 42 provides two charts depicting technical specifications and applications of the 180D.

Also depicted in FIG. 15 is a hammer handle 120 that may be grasped to assist in rotating the hammer 106 back and forth as described herein. Screws slots 122a-d shown in FIG. 15 are sunken areas in the assemblies 102, 104 through which screws, nails, or similar devices may be driven to attach the assemblies 102, 104 to their respective panels. In an embodiment, the screws slots 122a-d may have holes provided in their bottom surfaces to relieve a user of the need to bore holes there to aid the attachment.

FIG. 13 depicts a hammer slot 124a that promotes the hammer 106 to rest flush against the frame dowel pin assembly 104. FIG. 14 depicts a hammer slot 124b that promotes the hammer 106 to rest flush against the frame hammer assembly 102. As noted, assemblies 102, 104 may be installed in a recessed manner in panels or may be affixed on panel out surfaces. Assembly of systems provided herein may not require tools after initial attachment of the assemblies 102, 104 to their respective panels. In an embodiment, the hammer 106 may be referred to as a pivot-arm.

What is claimed is:

1. A system for fastening panels at 90-degree angles and at 180-degree angles, comprising:
    a frame hammer assembly attached proximate a first edge of a first panel;
    a frame dowel pin assembly attached proximate a second edge of a second panel;
    at least one dowel pin protruding from the dowel pin assembly, the at least one pin inserted into an alignment hole in the frame hammer assembly upon placement of the first edge against the second edge and alignment of the assemblies;
    a rotatable hammer attached to the frame hammer assembly, the rotatable hammer attached, after rotation, to the dowel pin assembly; and
    a hammer magnet attached to the rotatable hammer and one of a frame magnet and a frame steel plate attached to the dowel pin assembly, the hammer magnet and the one of the frame magnet and the frame steel plate attracting and contacting after rotation,
    wherein the magnets and steel plates are partially or fully embedded into their respective assembly, and
    wherein the frame hammer assembly has alignment holes on two surfaces comprising an end surface and a top surface that are perpendicular to each other and are configured to receive dowel pins when the frame hammer assembly and the dowel pin assembly are positioned at one of 90 and 180 degree angles relative to each other.

2. The system of claim 1, wherein insertion of the dowel pin and attachment of the hammer after rotation promotes the first panel and the second panel to be joined at one of a 90-degree angle and a 180-degree angle.

3. The system of claim 2, wherein when the panels are to be joined at the 90-degree angle, alignment holes are located at a top and upward facing surface of the hammer assembly.

4. The system of claim 2, wherein when the panels are to be joined at the 180-degree angle, the alignment holes are located at an end panel of the hammer assembly and directly contact a similarly sized and similarly shaped end panel of the dowel pin assembly.

5. The system of claim 4, wherein the at least one pin protrudes from the end panel of the dowel pin assembly.

6. The system of claim 1, wherein the frame hammer assembly and the frame dowel pin assembly are semicircular in shape with straight edges positioned parallel to the edges of the panels.

7. The system of claim 1, wherein the frame hammer assembly and the frame dowel pin assembly are embedded into the first panel and the second panel, respectively, and optionally have covers promoting concealment of the assemblies.

8. The system of claim 7, wherein the assemblies are embedded into the panels such that outward facing surfaces of the assemblies are flush with surfaces of the panels.

9. The system of claim 1, wherein multiple instances of the frame hammer assembly are attached to the first panel and wherein multiple instances of the frame dowel pin assembly are simultaneously attached to the second panel.

10. The system of claim 1, wherein the hammer includes a hammer handle promoting movement of the arm.

11. The system of claim 1, wherein each assembly includes two screws slots for use in affixing the assemblies to panels.

12. The system of claim 1, wherein each assembly includes a hammer slot, each slot promoting flush contact of the hammer to assembly surface.

13. The system of claim 7, wherein the assemblies are alternatively not recessed into panels and are instead surface mounted onto panels.

14. The system of claim 1, wherein joining of assemblies and attachment of panels at one of a 90-degree angle and a 180-degree angles is completed without tools after initial attachment of the assemblies to the panels.

15. A system for joining panels at panel edges at a 90-degree angle, comprising:
    a first frame embedded into a first panel, the first frame including one of a first magnet and a steel plate;
    a second frame embedded into a second panel, the second panel and the first panel positioned at a 90-degree angle; and
    a rotatable hammer attached to the second frame that, when rotated 90 degrees via a hinge, attaches to the first frame,
    wherein the second frame has alignment holes on two surfaces comprising an end surface and a top surface that are perpendicular to each other and are configured to receive dowel pins when the second frame and the first frame are positioned at one of 90 and 180 degree angles relative to each other.

16. The system of claim 15, wherein a second magnet is embedded in the hammer and attracts to one of the first magnet and the steel plate upon the rotation, the attraction promoting firm joining of the panels, wherein the magnets and steel plate are fully or partially embedded.

17. The system of claim 15, wherein the first frame includes at least one steel pin protruding from an edge of the first frame and parallel to a surface of the first panel.

18. The system of claim 15, wherein the second frame includes at least one alignment hole at a top surface to receive insertion of the at least one steel pin.

19. The system of claim 15, where the frames are embedded into their respective panels such that outward facing top surfaces of the frames are flush with surfaces of the panels.

20. The system of claim 15, wherein multiple instances of the first frame are embedded into the first panel and wherein multiple instances of the second frame are simultaneously embedded into the second panel.

21. A system for adjoining panels at a 180-degree angle, comprising:
    a first assembly embedded into and proximate a first edge of a first panel;
    a second assembly embedded into and proximate a second edge of a second panel, the edges joined upon the panels receiving adjacent positioning at a 180-degree angle;
    a rotatable pivot arm attached via a hinge to the second assembly, the arm containing an embedded first magnet; and
    one of a second magnet and a steel plate embedded into the first assembly that receives contact with the first magnet upon 180-degree rotation of the pivot arm,
    wherein the magnets and steel are fully or partially embedded,
    wherein the second assembly has alignment holes on two surfaces comprising an end surface and a top surface that are perpendicular to each other and are configured to receive dowel pins when the second assembly and the first assembly are positioned at one of 90 and 180 degree angles relative to each other.

22. The system of claim 21, wherein the contact, once established, promotes binding of the panels.

23. The system of claim 21, wherein a first surface of the first assembly makes direct and flush contact with a second surface of the second assembly upon joining of the panels at the 180-degree angle.

24. The system of claim 23, wherein at least one steel dowel pin protrudes from the first surface and receives insertion into at least one alignment hole in the second surface upon joining of the panels at the 90 and 180-degree angles, the insertion promoting binding of the panels.

25. The system of claim 21, wherein multiple instances of the first assembly are embedded into the first panel and wherein multiple instances of the second assembly are simultaneously embedded into the second panel.

\* \* \* \* \*